United States Patent [19]
Firoozmand

[11] Patent Number: 5,488,724
[45] Date of Patent: Jan. 30, 1996

[54] NETWORK CONTROLLER WITH MEMORY REQUEST AND ACKNOWLEDGEMENT SIGNALS AND A NETWORK ADAPTER THEREWITH

[75] Inventor: Farzin Firoozmand, Cupertino, Calif.

[73] Assignee: Advanced Micro Devices, Inc., Sunnyvale, Calif.

[21] Appl. No.: 883,748

[22] Filed: May 15, 1992

Related U.S. Application Data

[62] Division of Ser. No. 529,362, May 29, 1990, Pat. No. 5,136,582.

[51] Int. Cl.⁶ .................................................. G06F 13/16
[52] U.S. Cl. .............. 395/200.07; 395/250; 395/200.08; 395/427; 395/726; 364/DIG. 1; 364/242.3
[58] Field of Search .................................. 395/425, 725, 395/325, 250

[56] References Cited

U.S. PATENT DOCUMENTS

| | | | |
|---|---|---|---|
| 4,481,578 | 11/1984 | Hughes et al. | 364/200 |
| 4,729,090 | 3/1988 | Baba | 364/200 |
| 4,760,521 | 7/1988 | Rehwald et al. | 364/200 |
| 4,945,473 | 7/1990 | Holtey et al. | 364/250 |
| 5,007,051 | 4/1991 | Dolkas et al. | 370/85.1 |

FOREIGN PATENT DOCUMENTS 2201269A  1/1988  United Kingdom .

OTHER PUBLICATIONS

Hemant Kanakia, et al., "The VMP Network Adapter Board (NAB): High –Performance Network Communication for Multiprocessors", vol. 18, No. 4, Aug. 1988, pp. 175–187.
Kenzo Ohno, et al., "Optical High Speed (100Mbps) Token Ring System", IEEE, vol. 2, Dec. 1988, pp. 0645–0652.

*Primary Examiner*—Ken S. Kim

[57] ABSTRACT

Transmit and receive data are stored in buffer regions defined in first and second memories of a system residing on a network. The buffer regions are pointed to by multiple descriptor rings that are also stored in the memories. In accordance with one aspect of the invention, the two memories reside on separate busses connected to a common buss containing a processor. The processor communicates with one or the other of the memories using a handshaking protocol. In accordance with another aspect of the invention, receive data incoming to the system is scattered among multiple descriptor rings. A further aspect splits a frame among multiple descriptors depending on a characteristic code carried by the frame, e.g., in a frame control field. The size of the first descriptor, smaller than that of the others, is programmed to correspond to the size of the header of each frame. Synchronization between headers and data of a frame is maintained by a frame number stored in each descriptor. Another aspect prevents blocking of the receive path upon occurrence of a blocked receive descriptor ring. One application of the invention is in a fiber distributed data interface (FDDI).

20 Claims, 19 Drawing Sheets

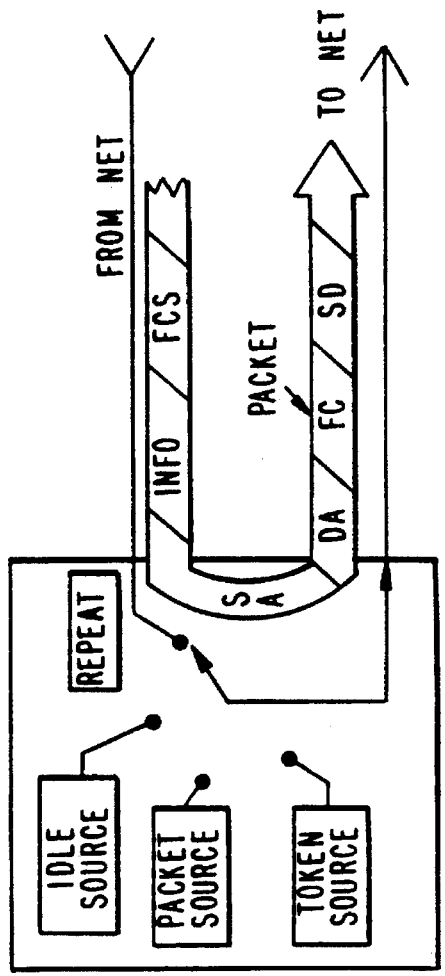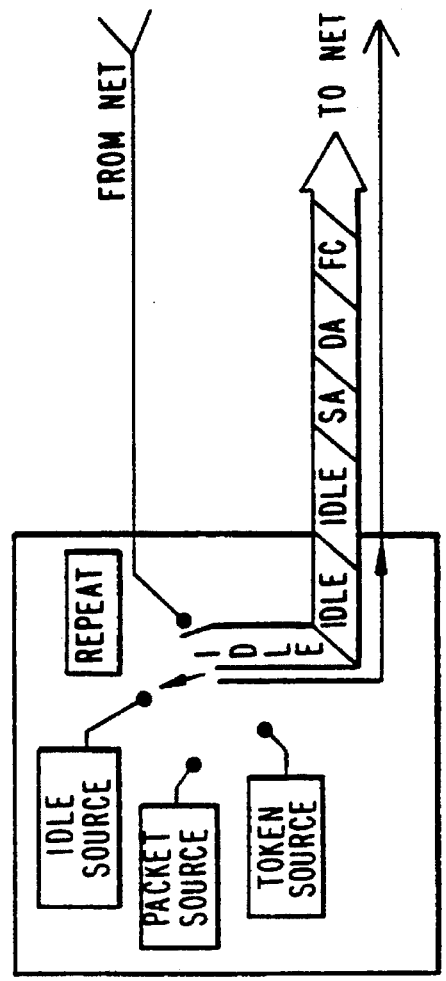

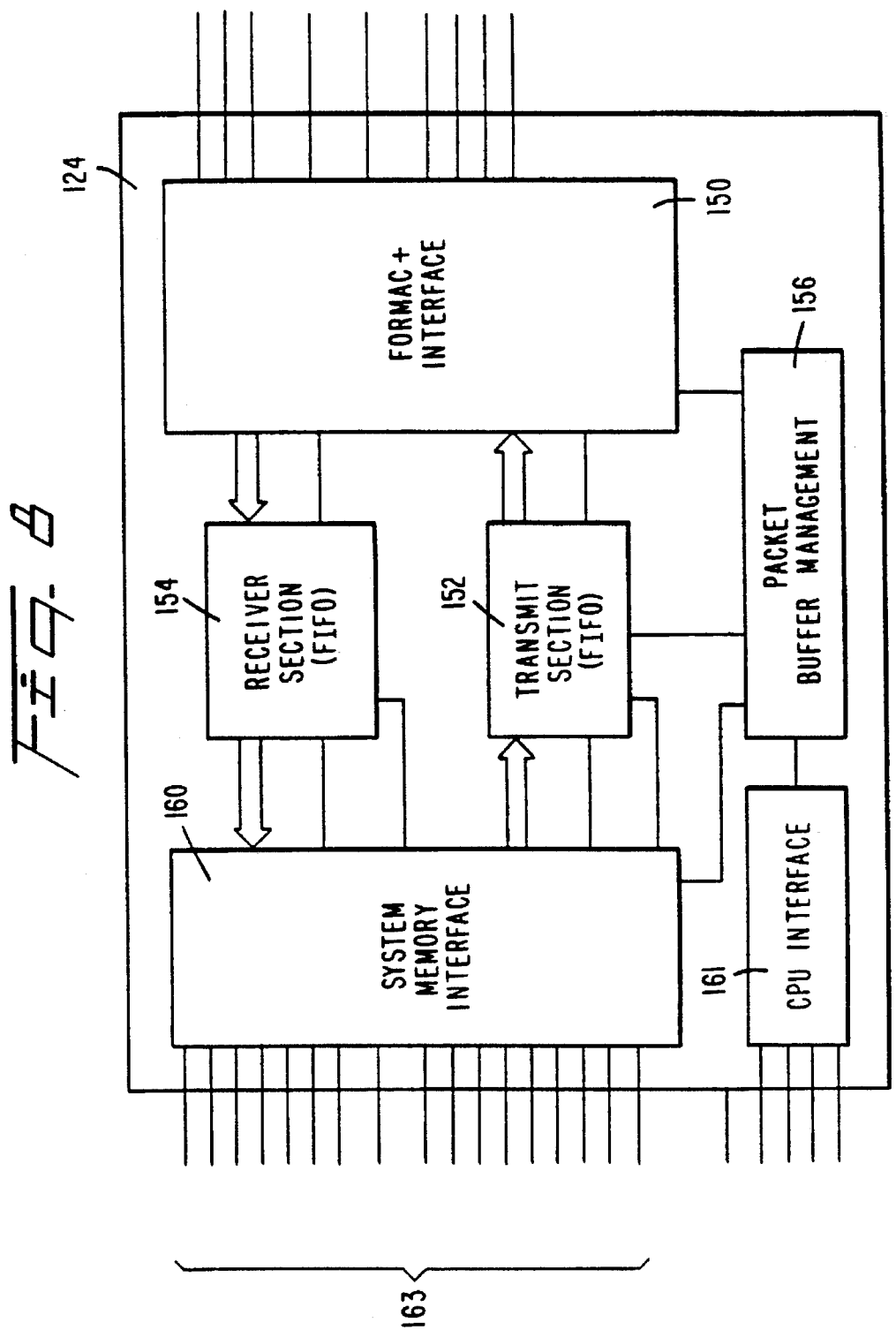

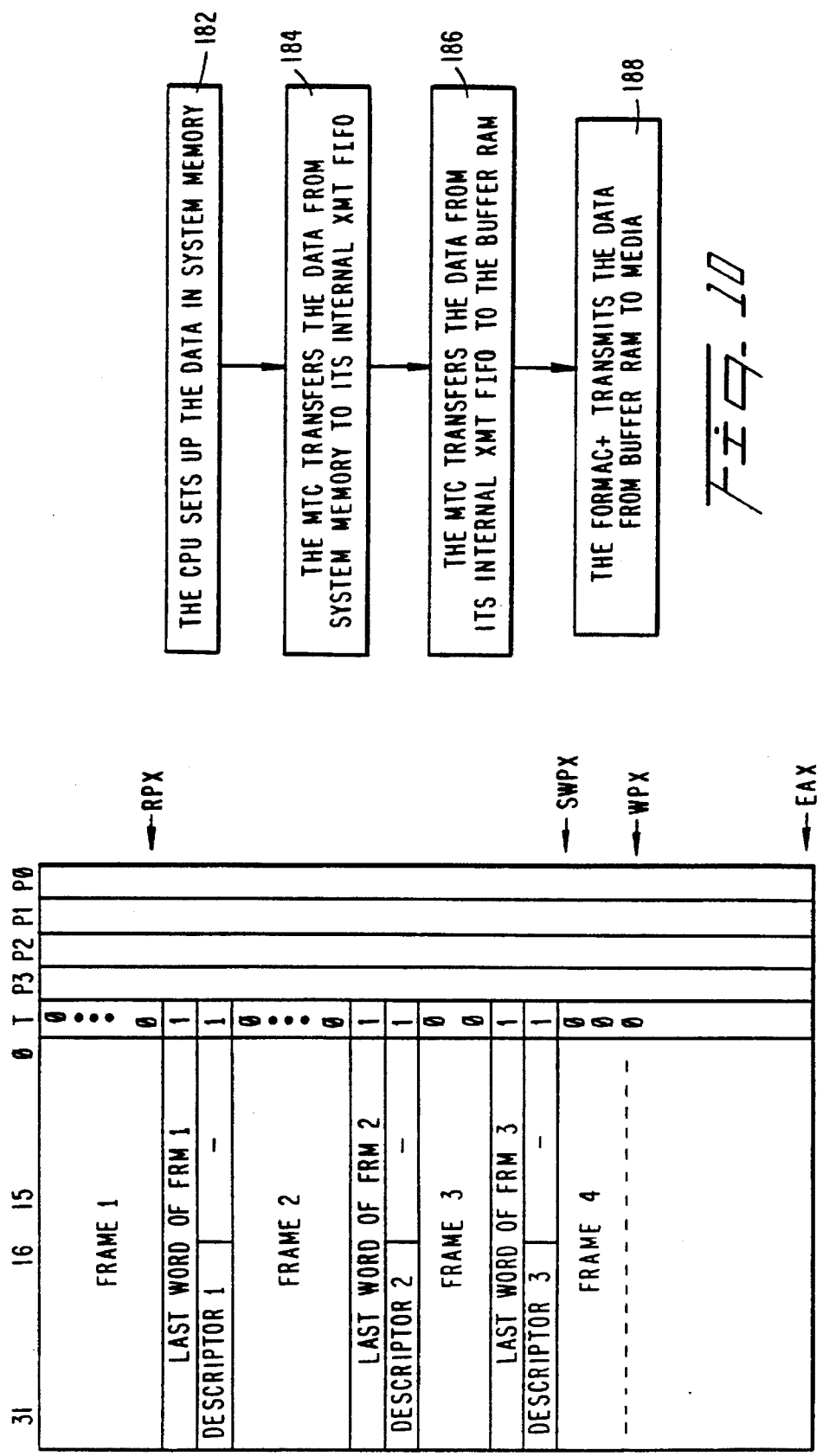

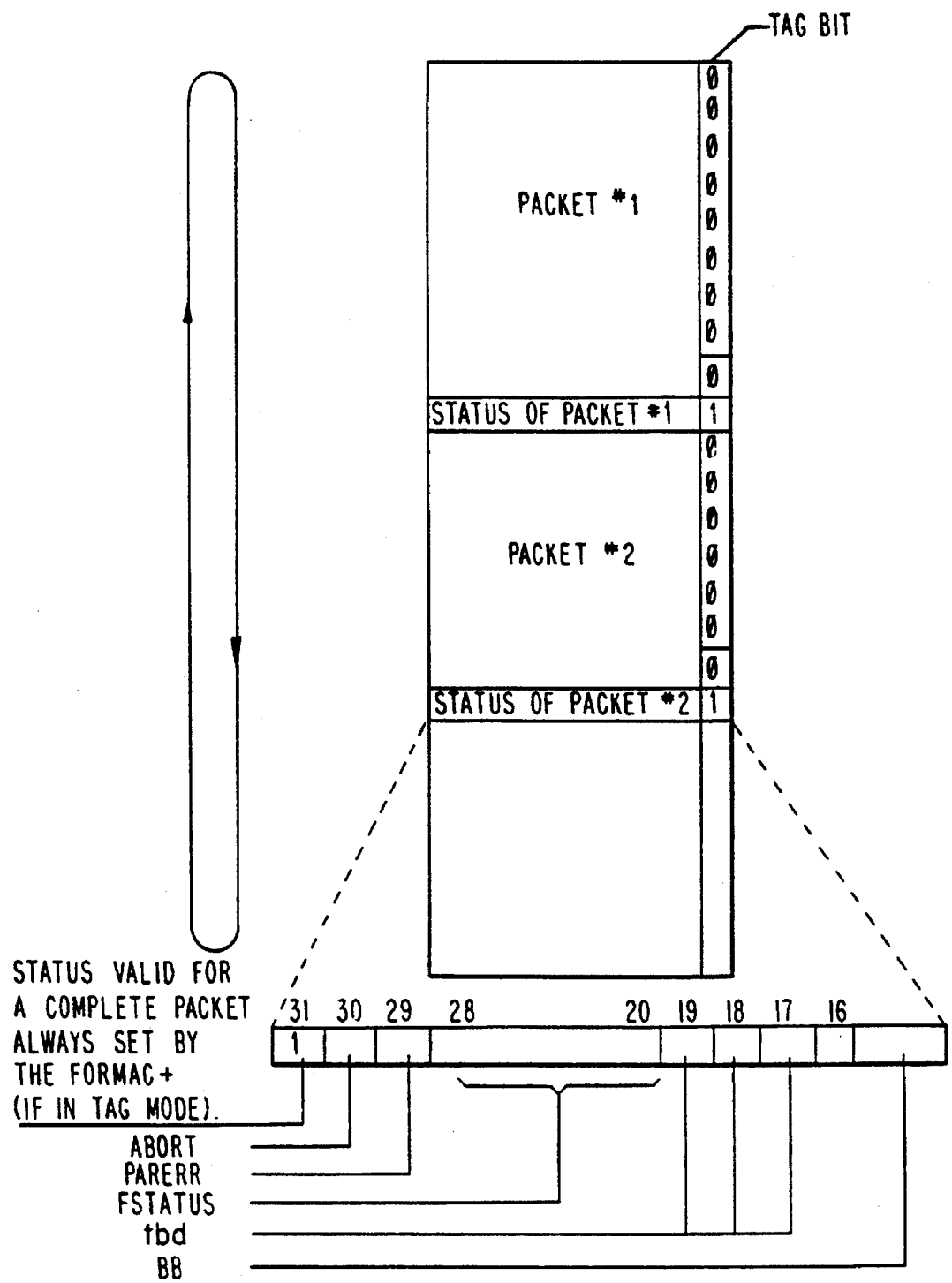

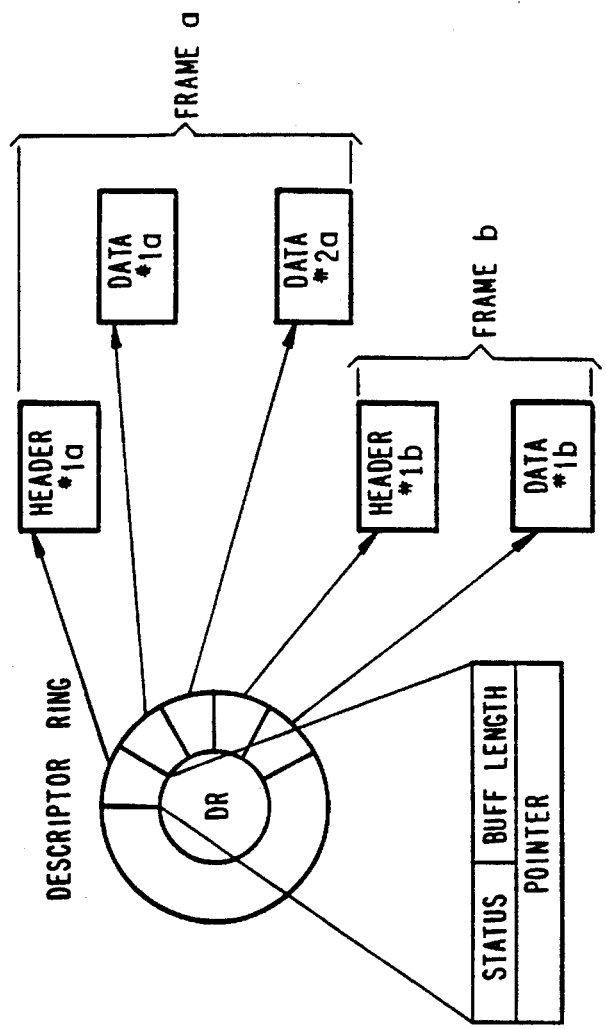
FIG. 22
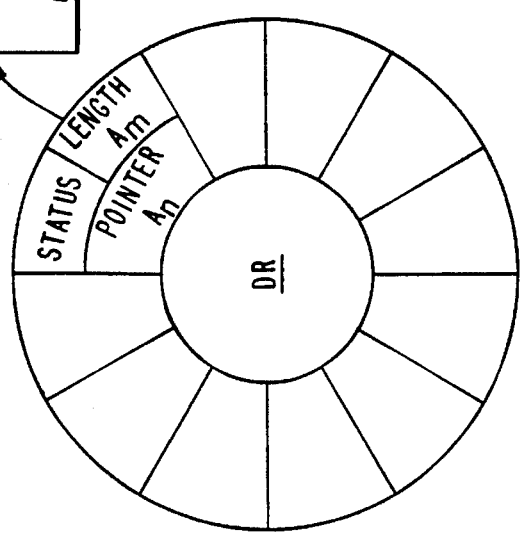
FIG. 20
FIG. 21

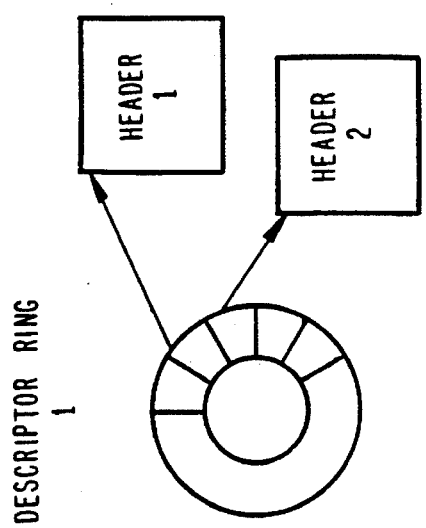
e.g. MATCH ON
FC(CFF=001)
(ASYNC LLC)
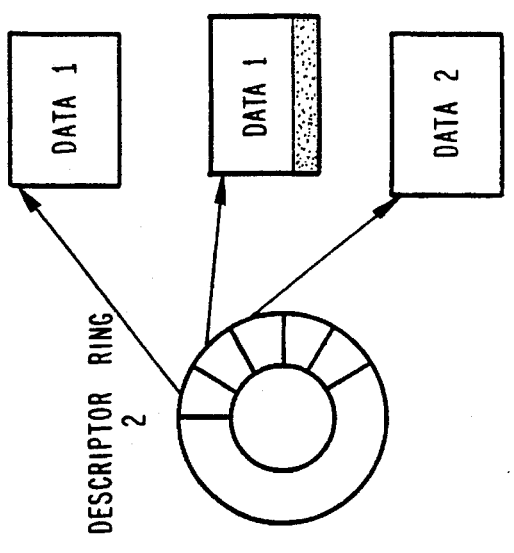
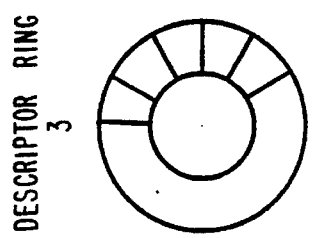
e.g. MATCH ON
FC(CFF=X00)
(SMT/MAC)
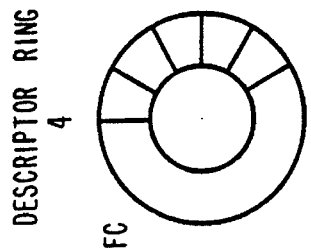
NO MATCH ON FC
Fig. 23

NETWORK CONTROLLER WITH MEMORY REQUEST AND ACKNOWLEDGEMENT SIGNALS AND A NETWORK ADAPTER THEREWITH

CROSS-REFERENCES TO RELATED APPLICATIONS

This application is a division of application Ser. No. 07/529,362 filed May 29, 1990, now U.S. Pat. No. 5,136,582.

This application is related to the following applications, owned by the assignee of this invention, and filed on even date herewith:

1) Firoozmand, Ser. No. 07/529,364, now U.S. Pat. No. 5,247,626, for "FDDI CONTROLLER HAVING FLEXIBLE BUFFER MANAGEMENT", 2) Firoozmand, Ser. No. 07/529,363, now U.S. Pat. No. 5,210,749, for "Configuration of SRAMs as Logical FIFOs for Transmit and Receive of Packet Data"

3) Firoozmand et al., Ser. No. 07/529,365, now abandoned, for "METHOD OF AND SYSTEM FOR IMPLEMENTING MULTIPLE LEVELS OF ASYNCHRONOUS PRIORITY IN FDDI NETWORKS", 4) Firoozmand, Ser. No. 07/529,366, now issued U.S. Pat. No. 5,043,981, for "METHOD OF AND SYSTEM FOR TRANSFERRING MULTIPLE PRIORITY QUEUES INTO MULTIPLE LOGICAL FIFOs USING A SINGLE PHYSICAL FIFO".

TECHNICAL FIELD

This invention relates generally to data manipulation in local and wide area networks, and more particularly to a method of and system for managing storage and retrieval of framed data in and from multiple memories, such as node and host processor memories, within a network. One utilization of the invention is in a Fiber Distributed Data Interface (FDDI).

BACKGROUND ART

1. Introduction

Rate of data throughput of any memory management system is limited by the number of steps of copying data in and from a system memory residing on a data bus which may be on a network of processors. One aspect of this invention implements transmit and receive descriptors that optimize data processing efficiency of a system memory comprising at least two distinct memories. Data having different levels of priority or other characteristic is received from the bus to be stored in the memory or gathered from the memory to be transmitted. The system memory may comprise node and host memories of a local or wide area network.

By way of example, the invention will be taught within the environment of a fiber distributed data interface (FDDI), described in the copending applications identified hereinabove; however as the principles taught herein are more applicable broadly to memory management systems, the invention is not to be limited to the environment described hereinafter.

2. Discussion

In data manipulation systems handling packets of data arranged in frames (a packet, or burst, of data including certain framing, or "housekeeping", bits is defined as a "frame"; data sent in the form of frames is termed "framed data"), there is often a requirement to transfer frames of data between a system at one location and a system at another location on a network. The frames of data may be arranged in queues representing the same or different levels of priority. An interface circuit that resides between a local system and a network, termed a "network controller", administers data flow between the system and network. This includes buffering the data to compensate for timing discrepancies between the system and network, providing any necessary protocol conversion and carrying out "housekeeping" by adding bits to or stripping bits from the data passing through the controller. Various types of network controller architectures are implemented based on the network operating system employed and on other considerations.

For example, in a network of a type described in copending application (1), supra, for "FDDI CONTROLLER HAVING FLEXIBLE BUFFER MANAGEMENT", incorporated herein by reference, there is a network controller comprising a bus master architecture wherein queues of framed data are transferred from buffers established in a system memory to corresponding regions formed by logical FIFOs in an output buffer for transmission to a network. Between the system memory and the output buffer is a physical FIFO having a predetermined storage capacity, e.g., 32 bytes, for storing the framed data temporarily in route to the output buffer. One purpose of the physical FIFO is to provide buffering of data that is required as a result of differences in the clock rates of system and network clocks. In copending application (2) for "Configuration of SRAMs as Logical FIFOs for Transmit and Receive of Packet Data," in response to a request for transmission to the network, upon receipt of a "token" on the network, and assuming that data is available for transmission, data is transferred from the system memory, one packet at a time, to the transmit FIFO, and then from the transmit FIFO to the network while data still is incoming from the network. This enables the FIFO to transmit to the network before a full frame is received. Frames of data thereby transmitted are stored in corresponding queues formed by the logical FIFOs configured in the output buffer.

Data is transferred in order of priority beginning with the highest until no additional data having the same priority is available for transmission or the unexpired token holding time (THT) during receipt of the token has become less than a threshold value for that priority. Details on this protocol are given in copending application (3), supra, for "METHOD OF AND SYSTEM FOR IMPLEMENTING MULTIPLE LEVELS OF ASYNCHRONOUS PRIORITY IN FDDI NETWORKS", incorporated herein by reference.

Following each transfer of framed data from the system memory, through the physical FIFO to the output buffer, a decision is made either to transfer additional data having the same priority to the physical FIFO thereafter to be transferred to the same output buffer queue, or to transfer data having a different priority through the physical FIFO to another output buffer queue if any additional data is available. Copending application (4) for "METHOD OF AND SYSTEM FOR TRANSFERRING MULTIPLE PRIORITY QUEUES INTO MULTIPLE LOGICAL FIFOs USING A SINGLE PHYSICAL FIFO", incorporated herein by reference, describes one means to prevent "locking-up" of the FIFO. Locking-up occurs when the amount of storage remaining available in the logical FIFO containing a particular queue to be written to is less than the storage capacity of the physical FIFO. Under this condition the physical FIFO cannot unload to the logical FIFO in the buffer.

A system of a type to which an aspect of the invention is particularly applicable incorporates not only a host processor but a node processor as well, each having its own associated memory. This architecture is advantageous as the node processor will free the host processor from communications tasks involved in protocol packet transmission. For example, protocol headers may be processed in the node processor memory while data is passed directly to and from the output buffer, and attached later to a packet for transmission. Rate of data throughput is increased by eliminating the necessity to carry out two steps of copying data for each memory transfer.

The copending applications utilize so-called transmit and receive "descriptors" that contain bits if information defining the status, length and address pointer of each of the buffer regions configured in the system memory. For a first-in first-out (FIFO) memory, wherein storage following the last storage position of the FIFO recirculates to the first, the descriptors take the form of a ring. Hence, a descriptor of this type is termed a "descriptor ring". The present invention is directed to efficient buffer management within a system incorporating multiple system memories and wherein frames or packets of data are stored in buffer regions pointed to by multiple descriptor rings.

Descriptor rings in accordance with the invention manage packet or framed data characterized by header as well as data portions. Normally, the header and data portions of the frame cannot be separated from each other conveniently as the two portions would become uncorrelated, or "lose synchronization" with each other among the buffers. Another aspect of the invention optimizes storage of framed data having header and data portions while maintaining synchronization between frames of data and their corresponding headers.

In a network controller of the type described, the receive data path incoming to the system memory through a single physical FIFO memory has a tendency to become blocked under certain circumstances. For example, if the receive descriptor ring is full or a parity error exists, subsequent packets destined for any descriptor ring in the receive path through the FIFO will become blocked. Although the subsequent packets will be stored in receive queues in the output buffer until the blocking cause is removed, the ring will become blocked again as the buffer has a limited storage capacity. A feature of this invention avoids blocking of the receive data path upon a blocked ring and is independent of the amount of buffer memory available to store queues of receive data during a block.

DISCLOSURE OF THE INVENTION

An object of the invention is to carry out improved data management in buffer storage systems.

Another object of the invention is to carry out efficient data management in a network implementing plural system memories.

Another object is efficient data storage and access in an FDDI network controller in a system having a host and node processor architecture.

Another object is to maximize the efficiency of data storage and transfer in a buffer memory system wherein buffers corresponding to common frames of receive data are established in plural distinct memories of a system.

A further object is to store separately the header and data portions of framed receive data in buffers configured respectively in first and second distinct memories of a system.

Still another object of the invention is to scatter framed receive data to particular descriptor rings of a novel multiple descriptor ring system based on a characteristic of the framed data.

Another object is to prevent blocking the receive path of the receive FIFO as a result of a blocked descriptor ring.

A further object of the invention is to carry out the above objects in a fiber distributed data interface (FDDI) system.

The above and other objects are satisfied in accordance with one aspect of the invention by a network adapter controlling flow of data arranged in packets from a system memory to a network. The network comprises a plurality of processors and at least first and second memories for storing data arranged in buffers. The first and second memories respectively are on first and second buses in turn connected in common to a third bus. The network controller comprises a network DMA controller on the third bus for sending thereon one or the other of a first memory request signal and a second memory request signal to access a selected one of the first and second memories. A control interface is coupled to the first bus and responsive only to the first memory request signal for sending a first memory acknowledgement signal to the DMA controller. The control interface is also coupled to the second bus and is responsive only to the second memory request signal for sending a second memory acknowledgement signal to the DMA controller. The network DMA controller further is responsive to the first and second acknowledgement signals for accessing only the selected one of the first and second memories. Hence, the adapter in accordance with this aspect of the invention enables a system processor on a common bus in a network to access either of first and second memories on separate buses connected to the common bus by carrying out a handshaking protocol.

In accordance with the preferred embodiment, the first and second memories comprise, respectively, host and node processor memories. The control interface accesses header information from the node processor memory and accesses data from the host processor memory. Receive frames are applied to separate descriptor rings for transfer, selectively, to locations in the host and node processor memories. Preferably, headers and transmit descriptors are stored in the node processor memory; transmit and receive data and descriptors are stored in the host memory.

In accordance with another aspect of the invention, wherein a network adapter includes a plurality of processors and at least first and second memories for storing in buffers receive data arranged in frames, a method of processing receive frames comprises storing first and second buffers having respectively first and second lengths, the first length being less than the second, at arbitrary locations in the first and second memories. First descriptors are established at contiguous memory locations to form a first descriptor ring in the first memory pointing to buffers for storing a first received portion of each frame of receive data in either one of the first and second memories. Second data descriptors are established at contiguous memory locations to form a second descriptor ring in the second memory pointing to buffers containing subsequently received portions of each receive frame in either one of the first and second memories.

The adapter in accordance with this aspect of the invention enables receive frames to be stored in multiple buffers pointed to by multiple descriptor rings. Scattered components of the same frame are correlated with each other by a common frame number.

The preferred embodiment implements this aspect of the invention to store header and data portions of a frame in separate buffers. A plurality of buffers are established at arbitrary locations in the first and second memories. Header descriptors are established at contiguous memory locations to form a header descriptor ring in the first memory pointing to buffers containing headers of receive data in either one of said first and second memories. Data descriptors are established at contiguous memory locations to form a data descriptor ring in the second memory pointing to buffers containing receive data in either one of the first and second memories.

The receive frames preferably include a frame number that correlates or "synchronizes" related header and data pairs.

In accordance with a further aspect of the invention, a plurality of buffers are established at arbitrary locations in the first and second memories. Similarly established arbitrarily in contiguous locations of the first and second memories are descriptors forming a plurality of descriptor rings pointing to the buffers. Each descriptor of each ring has an indicium pointing to one or the other of the first and second memories. Identification bits in a field of incoming frames of receive data are detected and correlated with particular descriptor rings. Each incoming frame of receive data is stored in a buffer pointed to by its descriptor.

This aspect of the invention implements a multiple descriptor ring system for managing multiple queues of diverse receive data. The invention enables incoming data having different priorities or other characteristic to be applied to multiple descriptor rings that point to corresponding multiple groups of buffers. The descriptor ring to receive each incoming frame is determined by matching the bits of the identification field with bits assigned to each ring. In FDDI the frame control field FC is implemented as the identification field.

In accordance with still another aspect of the invention, the receive data path is cleared upon an occurrence of a blocked descriptor ring by discarding incoming receive packets or frames when a blocked ring is detected. More specifically, the network adapter implementing this aspect of the invention includes a plurality of processors and memory means for storing packets of receive data arranged in frames and including information identifying a frame characteristic. The adapter further includes a FIFO memory and a receive data flow path through the FIFO memory to the memory means, means for establishing a plurality of receive buffers at arbitrary locations in the memory and means for establishing at contiguous locations in the memory means descriptors forming descriptor rings pointing to the receive buffers, and means for supplying receive frames incoming on the receive data path to a descriptor ring corresponding to the frame characteristic. A blocked descriptor ring in the receive data flow path is detected, and in response, subsequent frames incoming to the blocked descriptor ring are discarded. Although the content of the discarded framed will not be recovered, the data flow path is never blocked, enabling receive data designated to other descriptor rings to be supplied thereto.

Preferably, the network adapter is operative selectively in normal and discard modes. In response to a detected blocked ring and in the normal mode of operation of the adapter, subsequent packets incoming to the adapter are stored in the buffer memory. In response to a detected blocked ring and in the discard mode of operation, subsequent packets incoming to said adapter are discarded.

The method and apparatus of this invention are advantageously applied to an FDDI network interface, although the principles taught herein have applications more generally to buffer memory management.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIGS. 3(a) and 3(b) are diagrams showing operation of the MAC sublayer in FDDI specifications.

FIG. 8 is a more detailed diagram of the network DMA controller in the network interface architecture shown in FIG. 4.

FIG. 9 is a diagram showing a buffer memory transmit queue.

FIG. 10 is a generalized flow chart showing how data to be transmitted on the network is moved from the system memory.

FIG. 14 shows the format of receive packets stored in the buffer memory.

FIG. 20 is a diagram showing the general structure of Receive and Transmit descriptors.

FIG. 21 is a diagram of a descriptor ring.

FIG. 22 is a diagram showing linking of transmit frames using descriptors.

FIG. 23 is a diagram showing multiple receive rings in system memory receiving packets based on header/data splitting.

DETAILED DISCLOSURE OF A PREFERRED EMBODIMENT

Although a particular utilization of the invention is the an FDDI network, the invention has general applicability in the field of frame or packet data manipulation. Accordingly, whereas the disclosure of this invention will be made in the field of FDDI, it is to be understood that the aspects of invention are not to be so limited.

FDDI; General

Some background information on FDDI, helpful to obtain an understanding of the invention in that environment, is now provided.

Figure 1:
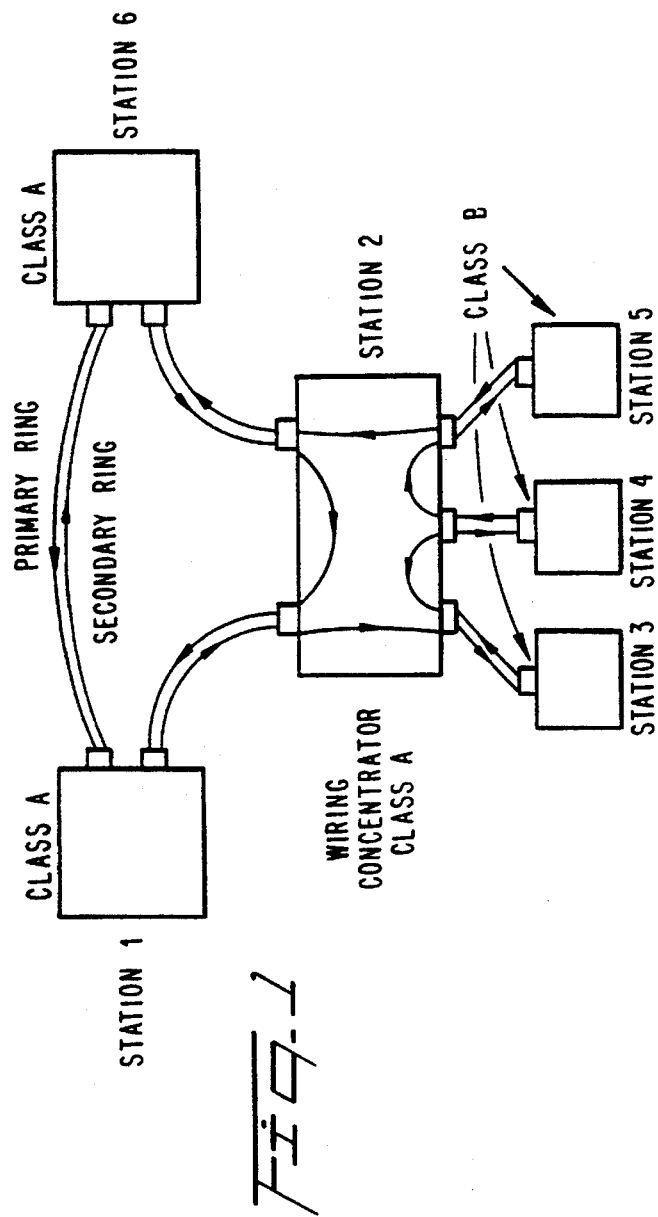
FIG. 1 is a block diagram of a typical implementation of an FDDI network of a type known in the prior art.

"Fiber Distributed Data Interface" (FDDI), based on fiber optic components and systems, and developed by the American National Standards Institute (ANSI) X3T9.5 Committee, defines a 100 megabit per second, timed-token protocol implementing dual counter-rotating physical rings. FIG. 1 is a simplified block diagram of an FDDI ring composed of a variety of station types. Class A stations, sometimes referred to as "dual attachment stations", are connected both to the primary and secondary rings of the network. Data flows in opposite directions on the two rings, as indicated by the arrows. The Class A stations can act as a wiring concentrator, serving to connect several single-attachment, or Class B, stations to the ring. In FIG. 1, station 2 is a wiring concentrator for stations 3, 4 and 5; concentrators provide the network administrator with a single maintenance point for a large number of stations. Data transferred between stations is in the form of framed packets.

Figure 2:
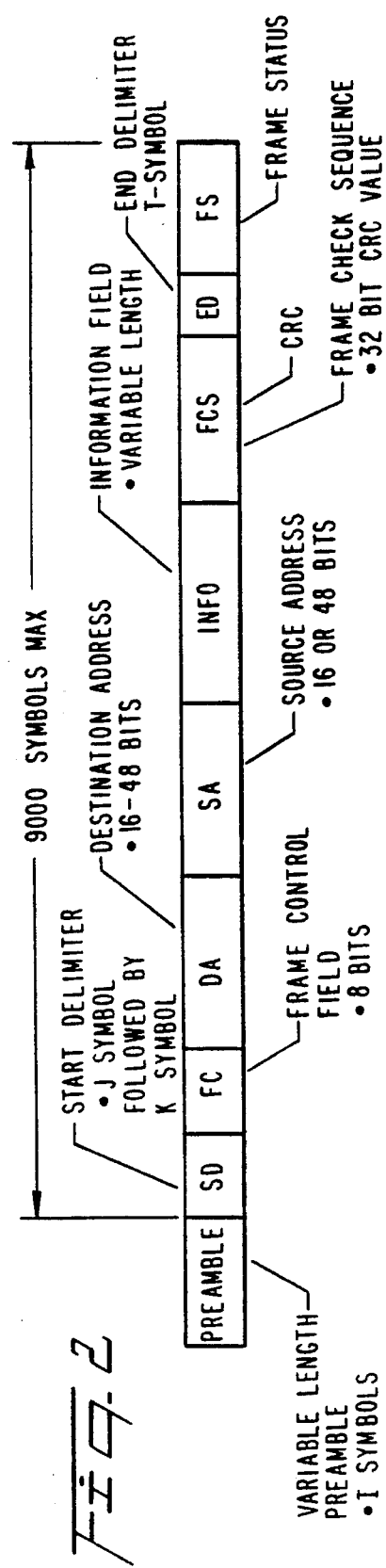
FIG. 2 is a diagram showing the format of an FDDI packet.

The format of an FDDI packet is shown in FIG. 2. Packets are preceded by a minimum of 16 idle control symbols (preamble). Packets begin with a start delimiter (SD) composed from the J and K control symbols of the 4B/5B code, well known in the art. This is followed by a two-data-symbol frame control (FC) field that identifies the type of packet. The destination address (DA) identifies the intended recipient of the packet. Likewise, the source address (SA) identifies the sender of the packet. Addresses can be either 26 or 48 bits in length. The DA field can point to a single station, a group of stations, or all stations on the ring.

Following SA comes the variable length information field. A frame check sequence (FCS) field contains 4 bytes of data. These data are the result of a 32 bit Autodin II cyclic redundancy check polynomial. The FCS insures data integrity of the FC, DA, SA, INFO and PCS fields.

Following the FCS field, an end delimiter (ED) formed with the T symbol is transmitted. The frame status (FS) field is used for symbols that determine whether the packet was received with error, if the address was recognized, or whether the packet was copied.

Packets are removed from the FDDI by the originating station. In this process, called "stripping" and shown in FIGS. 3(a) and 3(b), a medium access controller (MAC) 20 selects a source of IDLE control symbols for transmission on the ring. When a start delimiter arrives, the controller switches to a repeat path. The packet is monitored, copied if required, and simultaneously repeated. The medium access controller 20 also can switch to source its own packets or issue a token.

In token-passing, stations distribute the right to transmit on the medium by circulating a "token", which is a special bit pattern that assigns the right to transmit to the station that receives it. A station that wishes to transmit waits until it receives the token from the previous station in the token-passing order. When the station receives the token, it transmits its data, then passes the token to the next station.

An FDDI station waiting to transmit must first "capture" the token by performing the stripping action. Only the token SD field is repeated on the ring. Once the token is captured, the station can begin transmitting packets. When the last packet is sent, the station immediately follows by issuing a new token.

The rules for capturing the token and the amount of time allotted for data transmission are governed by "timed token protocol" defined in FDDI specifications and summarized in copending application (3), supra, and incorporated herein by reference. The protocol is designed to guarantee a maximum token rotation time (TRT), decided in a bidding process among stations during a Claim process on initialization. The bidding process allows the station requiring the fastest time between token arrivals to dictate a target token rotation time (TTRT) for the ring.

Timed token protocol offers two types of transmission service, namely, synchronous service and asynchronous service. Stations are given a predetermined amount of transmission bandwidth on each token rotation with synchronous service; the remaining ring bandwidth is shared among stations using asynchronous service. Stations are allowed to send asynchronous transmission when the token service arrives earlier than expected. The amount of time allotted for asynchronous transmission is limited to the difference between the actual time of arrival by the token and the expected token arrival time. The allotment of bandwidth for asynchronous transmission is dynamic, with any unused bandwidth for synchronous transmission being automatically reallocated for asynchronous transmission on a token rotation.

FDDI; Interface Circuit Implementation

Figure 4:
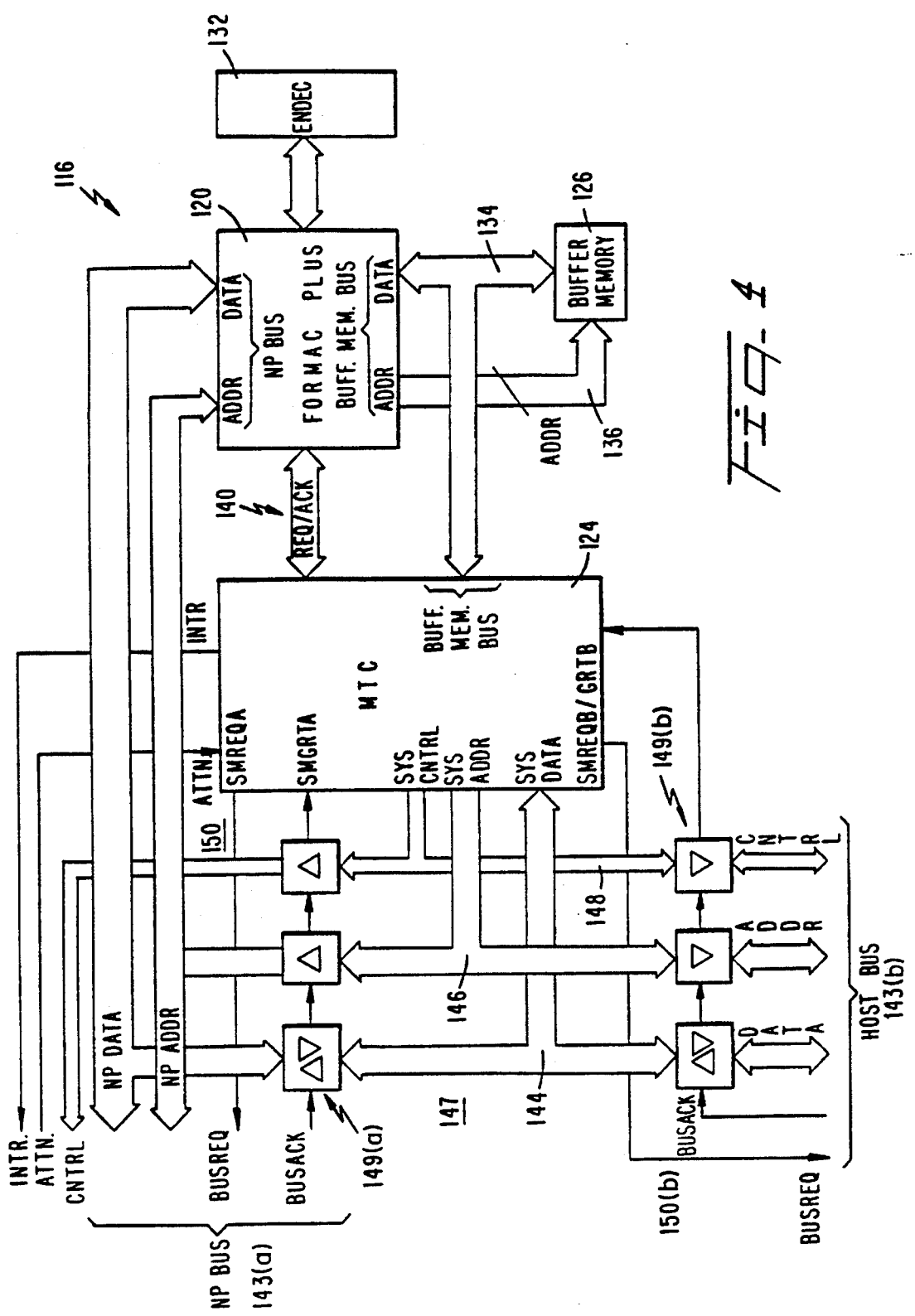
FIG. 4 is a block diagram of an implementation of the network interface[, with separate node processor and host].

With reference to FIG. 4, in an FDDI interface in accordance with the preferred embodiment of the invention, a master bus architecture, shown generally as 116, is provided between a system, or user, bus and a network in the form of a fiber optic medium. The principal components of the bus master architecture 116 comprise a medium access controller (MAC) 120 for accessing the medium through an encoder/decoder (ENDEC) 132 that receives data frames from controller 120 and performs appropriate encoding of the frames before converting the data from parallel to serial format and carrying out other "housekeeping" functions to satisfy FDDI requirements. A network DMA (direct memory access) controller 124 controls transfer of data between host and node processor memories (not shown) on the system bus and an output buffer 126, configured to have at least one FIFO (first in-first out) memory, connected between the network DMA controller and the medium access controller. The medium access controller 120 implements proper network access protocol, receiving and transmitting frames of data while carrying out any required housekeeping functions such as frame stripping, error checking and bus arbitration. The network DMA controller 124 operates as a front end bus master, communicating with the host or node processor together to scatter and gather data from and among system memories and the buffer while minimizing movement of data in the memory.

Figure 5:
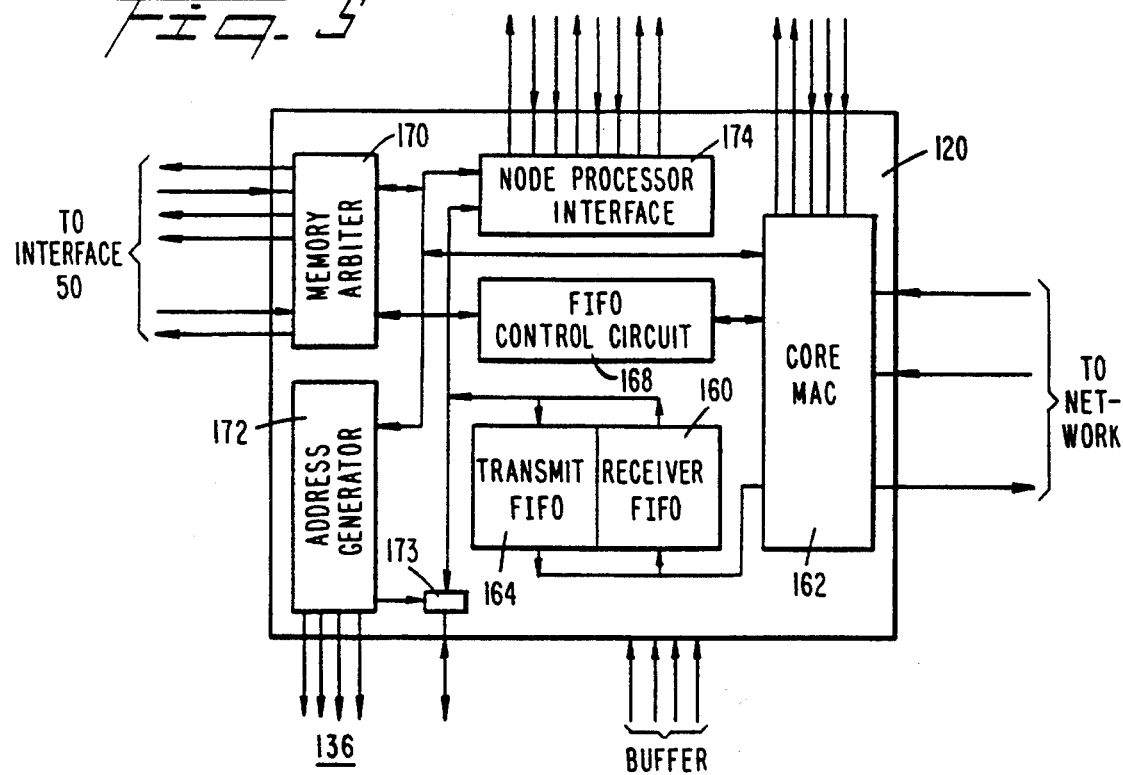
FIG. 5 is a more detailed diagram of the medium access controller shown in FIG. 4.

The medium access controller 120 is interfaced to buffer memory 126 through a data bus 134 and an address bus 136, and to the network DMA controller 124 through data bus 134. Handshaking is carried out between the controllers 124 and 120 on a bus 140 to control movement of data to and from the medium. Controller 120, shown in FIG. 5, is described in detail hereafter.

The network DMA controller 124 resides on a host bus 142 comprising a shared data bus 144 and address and control busses 146, 148. Control signals to the network DMA controller 124 are interfaced to the host and node busses, 143*a,b* on bus request and acknowledgement lines 150*a,b*. Medium access and network DMA controllers 120 and 124, together with output buffer memory 126, cooperate to carry out network interface operations on the various busses shown, as described in more detail in copending application (1), supra, incorporated herein by reference.

Figure 6:
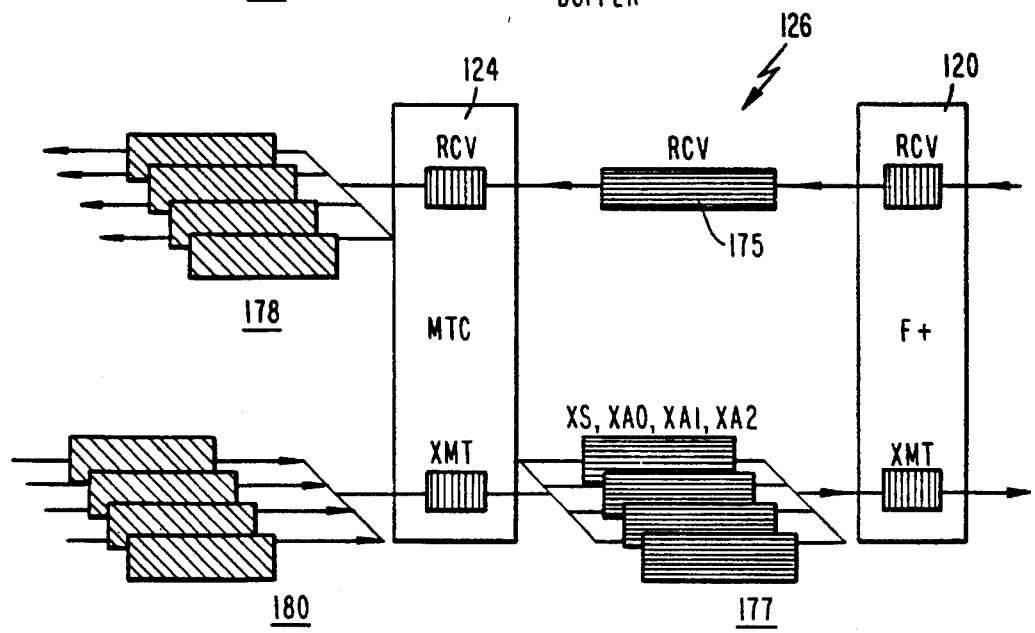
FIG. 6 is a diagram showing data flow carried out among the elements of the network interface.
Figure 7:
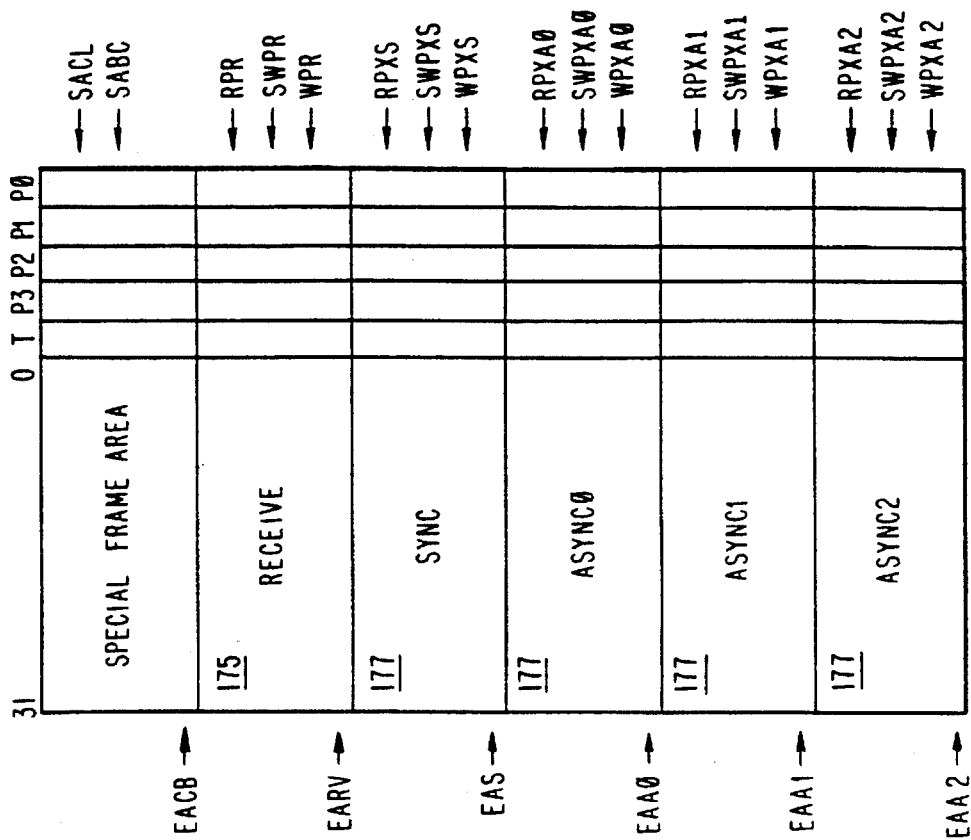
FIG. 7 is a diagram showing the organization of the buffer memory in queues implemented in the network interface.

Referring to the block diagram of FIG. 6, the output buffer 126, (FIG. 7), is configured to have a receive FIFO 175 containing a queue of data received from the medium and at least one, but preferably four, transmit FIFOs 177 each containing a queue of data to be supplied to the medium. Four queues shown in FIG. 7 represent one synchronous queue and queues containing data having three different assigned levels of priorities in accordance with FDDI specifications. The output buffer 126, which preferably is a static random access memory (SRAM), is programmed by firmware to have four FIFOs each containing a data queue of a different priority; specifically each FIFO is defined as a buffer region in the system memory using "descriptors" as described in detail hereinafter.

Data received from the medium is supplied by the network DMA controller 124 to the system memory through link list queues 178, and similarly, data is transmitted to the medium from the system memory through link list queues 180 that correspond to the synchronous and three levels of asynchronous priorities.

Prior to any operation involving the output buffer 126, the node processor must load into the buffer the end addresses of all the queues. Queue pointers are in the order shown in FIG. 7, i.e., pointers define first the end of a special frame area, then a receive queue and next transmit queues in the order of sync queue followed by asynchronous queues having three levels of priority. Also programmed by the node processor are the read/write pointers of all queues used, as shown in the right hand column of FIG. 7; end address pointers are shown in the left hand column of the figure.

More specifically, each queue of the FIFO shown in FIG. 7 is characterized by an "end of address" pointer having the prefix "EA". For example, ignore the SPECIAL FRAME AREA. The SYNC queue, containing synchronous data, is characterized by an end of address pointer "EAS"; the three asynchronous queues are characterized by end of address pointers "EAA0–EAA2". Each queue furthermore is defined by READ, WRITE pointers which point to the locations from which data is read and to which data is written, in a conventional manner. The difference between the READ and WRITE pointers represents the amount of data stored in the queue. For example, in FIG. 7, RPR and RPXA0–RPXA2 represent the READ pointers for the synchronous and three levels of asynchronous data queues in accordance with FDDI standards. All of these READ pointers are at the top of the respective queues. The pointers WPXS and WPXA0–WPXA2 represent WRITE pointers for the synchronous and three levels of asynchronous data, at the ends of the respective queues.

A SHADOW WRITE pointer (SWP) points to the end of the frame most recently stored in a queue. The function of the SHADOW WRITE pointer (SWP) and its relationship to the other pointers shown in FIG. 7 are discussed in detail in copending application (2), incorporated herein by reference.

How the network access and network DMA controllers 120, 124, together with buffer memory 126, cooperate to carry out network interface operations on the various buses shown, shall be described hereinafter. For the present, a more detailed description of the principal components of the interface, viz., the network DMA controller 124, medium access controller 120 and output buffer 126, will next be given.

Network DMA Controller 124

The network DMA controller 124, shown in detail in FIG. 8, comprises an interface circuit 150 connected between the medium access controller 120 and the network DMA controller 124. The interface 150 communicates with a transmit section containing at least one, and preferably four, FIFOs 152, a receive section 154 containing a FIFO, and a packet buffer management circuit 156. The interface 150 transfers data stored in the transmit section 152 to the buffer memory 126 as well as transfers data from buffer 126 to receive section 154. Transfers of data from the buffer 126 to the receive section 154 are made on command by the medium access controller 120 when data on the network is available to the system and other conditions including receipt of at least a predetermined amount of receive data in the buffer are satisfied. Transfer of data from transmit section 152 are carried out when data from the system memory is available in the transmit section, the data queue therein is unlocked and other conditions including at least either a full frame or at least a predetermined amount of transmit data stored in the buffer described in copending application (2) are satisfied.

Packet buffer management circuit 156 indicates to the medium access controller 120 what type of data is present in the transmit section, so as to load the buffer memory in appropriate queues depending on the priority of data in accordance with FIFO specifications. If a queue becomes full, the interface 150 signals the packet buffer management circuit 156 to lock that queue to finish emptying the current FIFO and to suspend that queue. If a transfer is incomplete, the circuit 156 continues with other pending transfers until interface 150 signals that the queue becomes unlocked. At that time any suspended transfer is continued. If transmit and receive data are requested from the FIFOs in sections 152 and 154 at the same time, the interface 150 prioritizes these transfers based on the sequence of events in accordance with a predetermined transmit and receive priority order.

The packet buffer management circuit 156 decodes command word codes, transmits, requests clear error commands and sends appropriate information to the system memory interface 160 as well as to transmit section 152. The packet buffer management circuit 156 prioritizes command requests, transmit requests from FIFO 152 and receive requests from FIFO 154. The management circuit 156 then issues commands to a system memory interface 160 to grant either transmits or receives or to process one of the commands, and is interfaced to the system through CPU interface 161.

Transmit section 152 maintains all transmit queues and prioritizes operations in a predetermined priority. The FIFO 152 carries out byte ordering and data gathering, and formats the data into FIFO oriented packets to be processed by the medium access controller 120. Various transmit queues in the transmit section 152 are controlled, so that when the buffer memory 126 fills up a queue, queue switching is carried out. All necessary information for the locked queue is stored so that operation can be resumed when the queue becomes unlocked. The FIFO included in the transmit section 152 is also used for data buffering and rate adaptation between system memory interface 160 and network access control interface 150. Buffering is required in the network DMA controller 124 because data transfer rates on the system memory bus and on the network are independent.

Receive section 154 receives FIFO oriented frames from output buffer memory 126 and scatters them into receive buffers in the system memory. The receive buffers are pointed to by descriptor rings. The section 154 further contains a FIFO to provide rate adaptation between the network and system memory in the same manner as the transmit FIFO 152.

System memory interface (SMI) 160 comprises a high speed programmable bus interface, address generation circuitry and storage for the system memory. The interface 160 also-contains end-of-ring detection circuits for buffer management in the system memory, and a primary control state machine for the system memory interface.

Signals supplied from the system memory interface 160 at lines 163 to the system are synchronous with a system clock SCLK (not shown). These signals request access of one system memory from an external arbiter (not shown). Another signal grants the network DMA controller 124 the right to access the system memory. An address bus at the output of SMI 160 addresses all system memory accesses, and a system memory read/write line indicates whether data is being transferred from the system memory to controller 124 or from the controller to the system memory. Other signals at the output of SMI 160 indicate status of the system memory, indicate errors, and enable or disable external data buffers to prevent bus contention between reads and writes to system memory. Another SMI signal activates a latch in the SMI to latch data to the system memory for a write operation.

Signal lines at CPU interface 161 include a signal indicating that the network DMA controller 124 must read a command from memory and directing the controller to carry out the memory access. Another line signals the CPU that the network DMA controller has written a new status word in memory, and another deasserts the interrupt.

Figure 15:
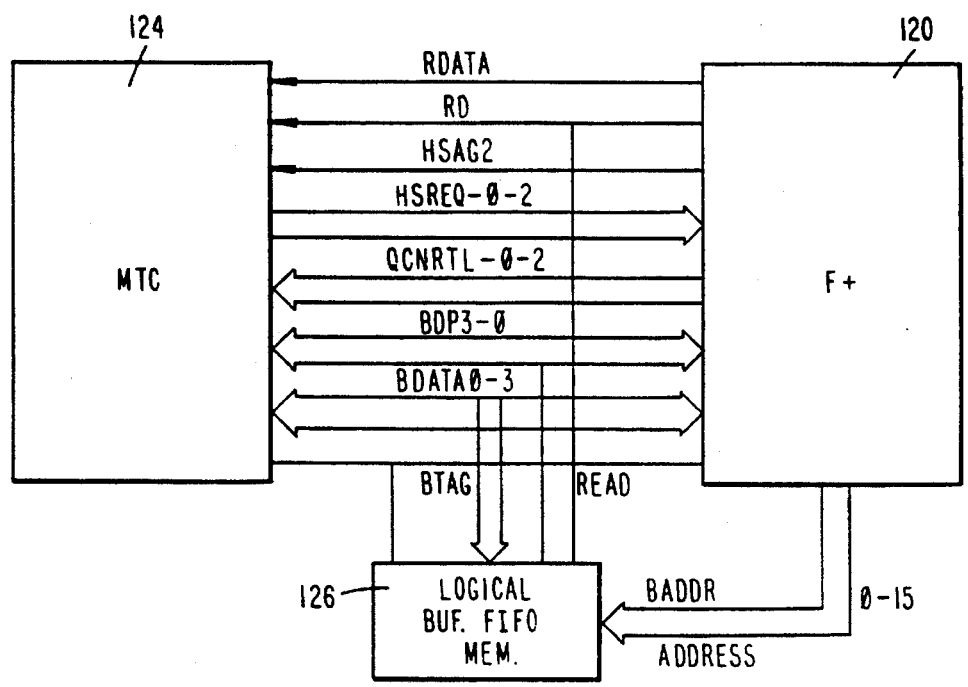
FIG. 15 is a diagram showing flow of signals among the medium access controller, the network DMA controller and the buffer memory.

At the output of the interface 150 are a host request bus that contains encoded requests to access buffer memory 126 through the medium access controller 120. Depending on the code carried on the host request bus the buffer memory 126 is accessed to read data or to write data in any of four transmit queues. The read request retrieves receive packets from the buffer 126 and stores them in system memory. Write requests transfer packets into buffer memory for transmit. Also at the output of the interface 150 is a host acknowledge line carrying a signal indicating that the present write or read request of the network DMA controller 124 is being granted by the medium access controller 120. Together with this signal, buffer memory 126 is enabled, and data is present on a data bus, data parity bus and data tag bus, to be described hereinafter (FIG. 15). The interface also provides a read output to latch data into the network DMA controller 124 when the medium access controller 120 reads data from buffer memory 126 into the DMA controller. A receive data line indicates that receive data is present in the buffer 126 and is ready to be transferred to the system memory. Other lines, to be described hereinafter, indicate the status of the currently accessed transmit queue in buffer 126.

Figure 16A:
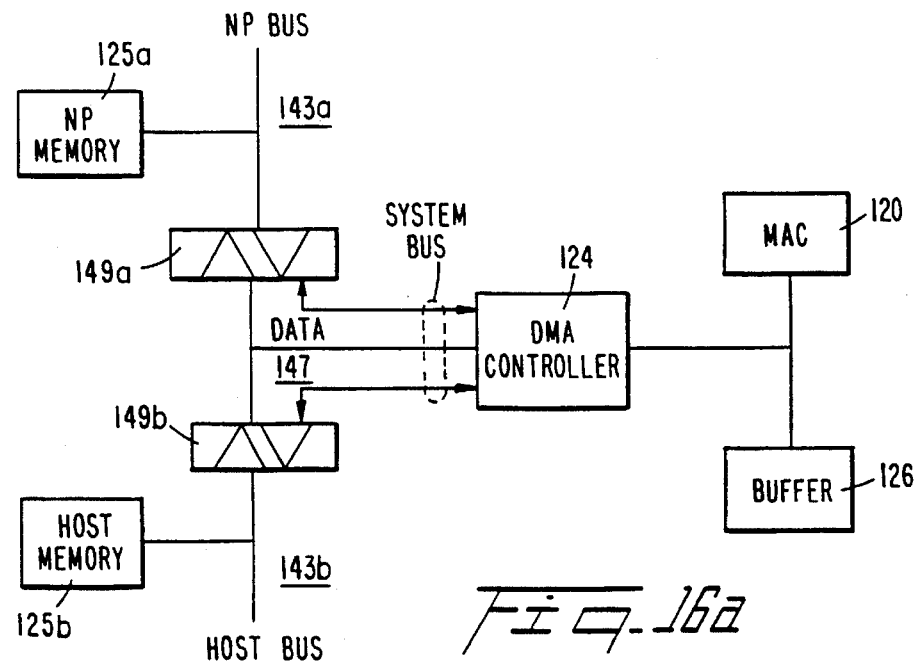
FIG. 16(a) is a block diagram showing node and host processor memories on separate node and host processor busses.
Figure 16B:
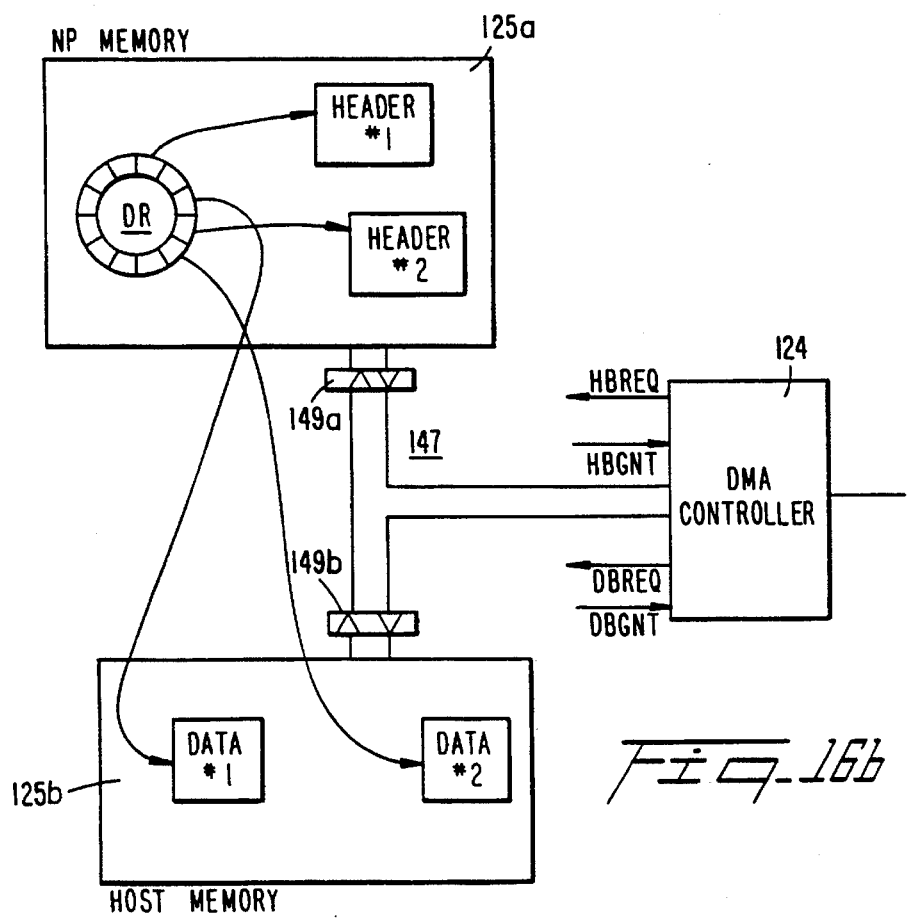
FIG. 16(b) is a diagram showing handshaking between node and host processor memories and the network DMA controller to carry out header/data splitting.

In accordance with one aspect of the invention, the system memory controlled by network DMA controller 124 comprises first and second memories 125(a), 125(b), which in the preferred embodiment are node and host memories, residing on the node and host busses 143(a), 143(b) shown in FIG. 4. The node and host busses 143(a), 143(b) are coupled to the network DMA controller 124 through a system bus 147, which contains shared data bus 144 and control busses 146, 148. Drivers 149(a), 149(b) are controlled by the network DMA controller 124 to interconnect either the NP bus 143(a) or the host bus 143(b) to system bus 147. Referring to FIGS. 16(a) and 16(b), data is written to or read from one or the other of the NP and host memories 125(a), 125(b) on the two busses 143(a), 143(b) using a hand shaking protocol between the controller 124 and memories and through the drivers 149(a), 149(b).

The architecture of FIGS. 16(a) and 16(b), with separate node processor and host memories 125(a), 125(b), is advantageous because it enables transmit frames to be gathered from two physical memories, for transmission to a network. This enables data manipulation using descriptors to be efficiently carried out, with the node processor performing protocol processing while the host processor is supplying the data. In FIG. 16(b), for example, in accordance with one aspect of the invention, to be described in detail hereinafter, header information may be read from the node processor (NP) memory 125(a) and data from the host memory 125(b) to avoid additional copying of data. The network DMA controller 124 performs this function by "hand shaking" with the two memories using two sets of requests/grant signals.

In FIGS. 16(b) a header request-grant (HBREQ/HBGRT) pair is used to access NP memory 125(a), and a data request-grant (DBREQ/DBGRT) pair accesses the host memory 125(b). In this example, header data, together with a descriptor ring, is stored in the node processor memory 125(a); data only is stored in host memory 125(b). The header and data in the two memories are in buffers defined by descriptor ring DR stored in NP memory 125(a).

Similarly, the network DMA controller 124 can store receive data frames in buffers defined by two separate descriptor rings. This enables direct transfer of received data into two physical memory locations without the need of an extra copy. For example, headers and descriptors for receive data frames may be stored in the NP memory 125(a); receive data may be stored in host memory 125(b).

To access the NP memory 125(a), the network DMA controller applies a request signal HBREQ to the system bus 147. The request HBREQ is applied through drivers 149(a) and 149(b) to both the node processor and the host memories 125(a) and 125(b). Only NP memory 125(a) will respond with a grant signal HBGNT, to enable an access to the memory along a path consisting of NP bus 149(a), driver 143(a) and system bus 147. Because memory 125(b) does not respond to the request signal HBREQ, the memory 125(b) will not generate a grant signal and access will not be enabled to the host memory.

On the other hand, when an access to host memory 125(b) is required, the network DMA controller 124 will apply a request signal DBREQ to system bus 147. The request DBREQ is applied through drivers 149(a), 149(b) both to node processor memory 125(a) and host processor memory 125(b). Only the host processor memory 125(b) will generate a grant signal DBGNT to be received by the controller 124 along a path consisting of host bus 143(b), driver 149(b) and system bus 147. Access is now established between the host memory 125(b) and the network DMA controller 124.

Descriptor rings of the type identified in DR in FIG. 16(b) are an implementation of a well known technique to describe a buffer in a designated region of a memory, for storing data. A descriptor, shown in FIG. 20, comprises two long words LW1 and LW2. Word LW1 contains the status and length of the buffer to be defined in memory; word LW2 is a pointer pointing to the starting address of the buffer. Structures of transmit and receive descriptors are similar to each other.

A status portion of each descriptor reflects the status of the data buffer as well as the status of the packet of data to be stored in the buffer. If a receive packet requires more than one buffer, than the status of the packet is considered only at the last buffer descriptor of that packet.

Buffer status bits include an OWN bit that is set by the host processor to signify that this entry is a valid entry for the DMA controller 124 to use, and that the DMA controller "owns" the descriptor. When the network DMA controller 124 completes transfer of data to designated buffer, it resets the OWN bit, and releases ownership of that buffer to the host processor. This bit is valid on every descriptor.

An end of packet (EOP) bit, when set, marks the last buffer of a packet. If the packet resides in one buffer only, this bit must be set for that descriptor. If a bit is low, the packet continues in the next buffer.

An ABORT bit, if set, indicates that a present packet is not a complete packet. The EOP bit of a transmit descriptor is controlled only by the processor, and is valid on every descriptor. The EOP bit of a received descriptor is valid only on buffer 126 with the EOP bit set to one and is controlled by the network DMA controller 124.

Other status bits that may be implemented to describe other characteristics of the buffer, are omitted for brevity.

A series of buffers is described by the descriptor ring DR of FIG. 16, shown in more detail in FIG. 21. In this example, buffer B begins at address $A_n$ in system memory, and spans to address $A_{n+m}$, having a length $A_m$. The location of the buffer B may be, but is not necessarily, in the same physical memory as the descriptor DR. On transmit, descriptors DR can reside independently in the host and node processor memories 125(a), 125(b). On receive, the descriptors and corresponding buffers reside in the same memory.

Transmit data is gathered from buffers distributed in the two physical memories 125(a), 125(b) in buffers defined by a descriptor ring DR that may reside in either memory. Referring to FIG. 22, assume that two successive frames of data to be transmitted to a network are frame a and frame b. Frame a comprises a header in buffer a and data distributed in buffer 1a and 2a; frame b comprises a header in buffer 1b and data only in buffer 1b. The descriptor ring DR accesses frame a and frame b data in succession for transmit of data to the network, as shown. The data contained in the two frames may be distributed in both physical memories 125(a), 125(b).

For example, assume that 10000 bytes of data are to be transmitted to the network. In an FDDI network, only 4500 bytes per frame can be transmitted each time. Each frame of 4500 bytes will require a header. Assume that a synchronous data having priority level "0", or highest priority, is to be transmitted to the network. The first descriptor in the ring points to buffer 1a containing the transmit header, and the second descriptor points to the first buffer 1a storing transmit data. A third descriptor points to a third buffer containing transmit data 2a. The first three descriptors accordingly gather the first frame of data to be transmitted to the network. The forth descriptor points to a forth buffer containing transmit header 1b of frame b, and the fifth descriptor-points to another buffer containing transmit data 1b, completing frame b. If frame b contains the same header data as frame a, the forth descriptor will point to the first header, to be combined with data 1b to complete the second frame.

Figure 11:
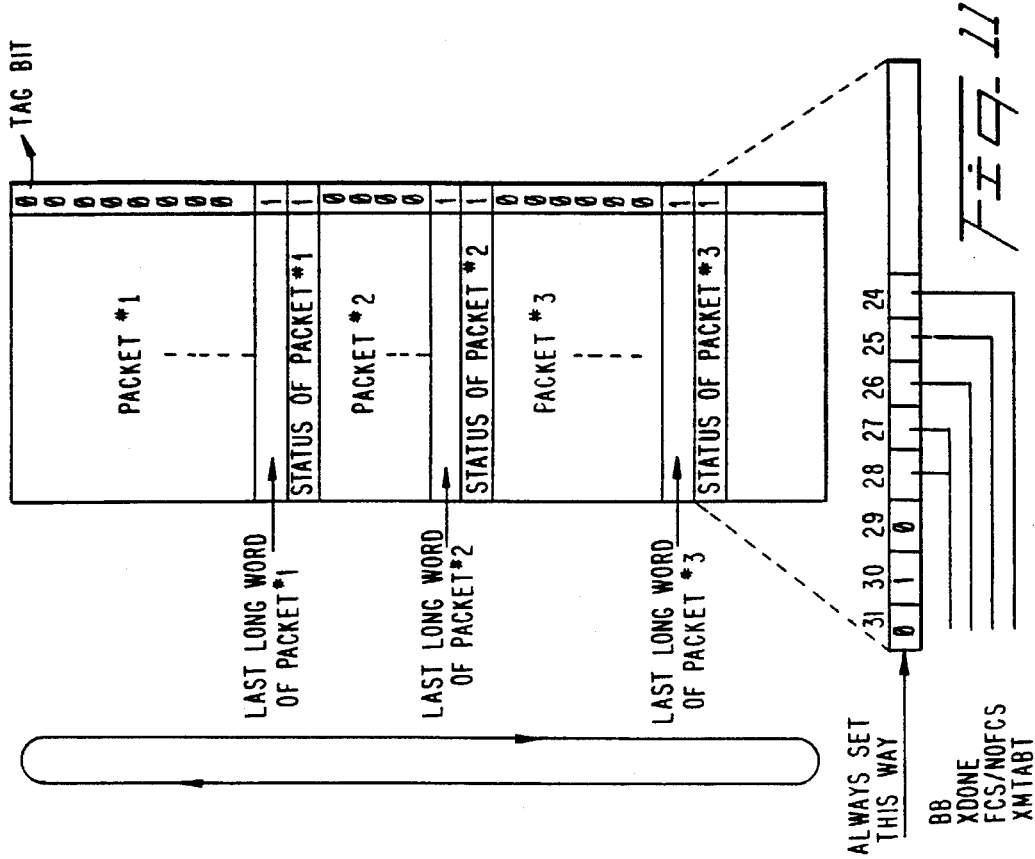
FIG. 11 is a diagram of transmit packets queued in the buffer memory.

Upon a request to transmit the host processor sets up a transmit descriptor and sets the OWN bit in the status field of the descriptor. The processor then supplies the network DMA controller 124 with an instruction to transmit. The controller 124 fetches the descriptor, finds the corresponding buffer, reads data into internal FIFO and transfers the data to the buffer memory 126. This process continues until the controller 124 reaches a descriptor having an EOP bit that is set, indicating that the end of a packet has been reached. At this time, the controller 124 sets a tag bit on the last word of the packet and at the status word following the packet in the buffer memory, as shown in FIG. 11.

The network DMA controller 124 will continue reading descriptors from the ring, until the OWN bit of a descriptor is reset. At that time, the controller 124 will stop reading from that ring, until a new instruction to transmit is supplied by the host processor. As data is gathered from the two physical memories 125(a), 125(b) for transmission to the network, handshaking between the memories and network DMA controller 124 by the REQ/GNT signal pairs as described earlier access the proper memory.

There is a separate descriptor ring for each priority of data. In this example, four separate descriptor rings, are utilized, one for synchronous and three for asynchronous priorities 0–2. However, the number of descriptor rings that are possible is arbitrary. Also arbitrary are locations in the two physical memories of transmit data buffers, to be gathered under control of a descriptor ring that itself can be stored in either one of the two memories. This enables arbitrary assembling of frames without actually copying and moving stored data.

Location of each buffer in one or the other of the two memories is encoded as a status bit of each descriptor. Accordingly, the network DMA controller 124 is able to determine which of the two physical memories, i.e., the node processor memory or the host memory, contains the buffer.

Establishing locations of receive buffers is more complex. Whereas the length of transmit packets is common and known and their locations in memory also are known, receive packets can be variable in length and locations must be defined dynamically as receive packets arrive from the network. The network DMA control 124, using descriptor rings, establishes a pool of free buffers throughout the system memory. As packets are received, the controller finds and arranges free buffers to store the received data, and designates packets to buffers in accordance with the descriptor associated with each packet.

Empty buffers in the system memory begin filling with received data as the data arrives and is accepted by the medium access controller 120. When a buffer becomes filled, the network DMA controller 124 accesses the descriptor ring to locate the next buffer, etc., until the end of the packet is detected by its EOP bit. When a new packet arrives, free buffers in the free buffer pool, designated by the corresponding descriptor ring, begins to fill.

It is advantageous under some circumstances to store received packets into different buffers using separate descriptor rings. For example, first and second parts of received data can be scattered by the invention to two separate descriptor rings. The first descriptor ring receives the first part of a frame, which ordinarily will comprise at least a part of the header, and the rest of the frame will be applied to the second descriptor. Separating the header and data portions of a frame enables the header to be shared conveniently among different data.

Preferably, each descriptor of the first descriptor ring will define a buffer length that is significantly smaller than that defined by the descriptors of the second ring. In the preferred embodiment, the length of each buffer defined by the first ring will be made equal to or slightly greater than the length of the largest header expected to be received.

Corresponding portions of a common frame are "synchronized" to each other by assigning to each buffer a number of bits as identification of buffers containing data or header belonging to the same frame.

Figure 24:
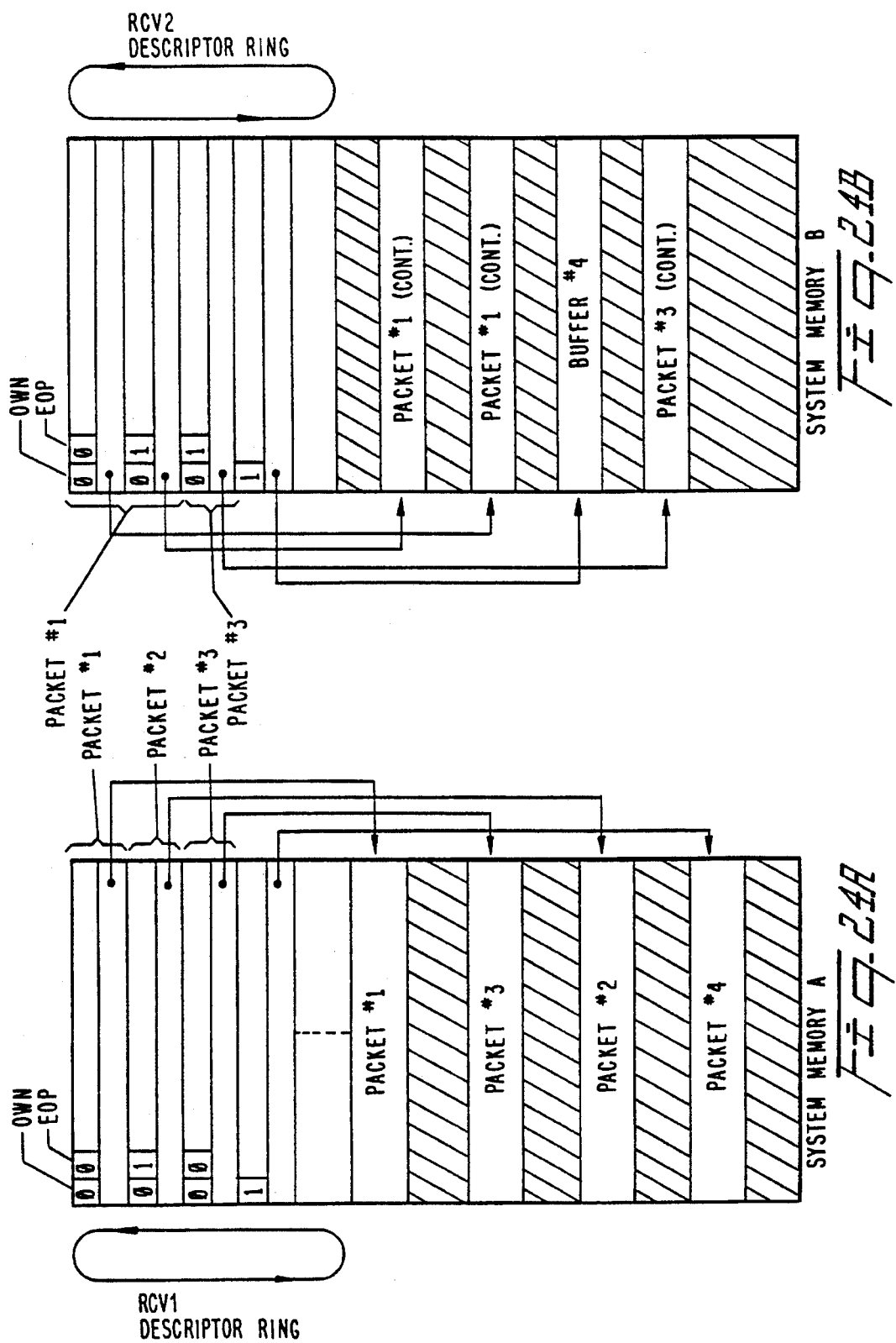
FIG. 24 is a diagram of receive frames routed to different physical memories based on header/data splitting.

When the processor is programmed to carry out a header/ data split, two receive descriptor rings operate as a pair. Referring to FIG. 23, if incoming data is to be applied to a descriptor ring 1, and header/data splitting is to be carried out, the first receive buffer designated by descriptor ring 1 is filled with the receive packet. If the buffer becomes filled, but the packet is not ended, the controller 124 switches to the second descriptor ring and continues storing the rest of the packet in the buffers defined by that ring. The first descriptor defines the first buffer of every frame, while the second ring defines the buffers storing buffers storing the rest of the frame. This is shown in detail in FIG. 24. Meanwhile, access of header and data to the two physical memories 125(a), 125(b) is carried out using handshaking with controller 124, as shown in FIG. 16(b).

Header and data portions of the same frame are correlated to each other by frame identification bits in the status field of the receive descriptor. The frame number bits preferably represent a modulo 8 number for each received packet in the first and second receive rings. Consecutive packets have consecutive numbers, and all the descriptors of one packet have the same number, i.e., a header buffer in the first receive ring and data buffers in the second receive ring all have the same frame number. This simplifies correlation of the descriptors containing headers and data of the same frames in the two receive rings.

Figure 25:
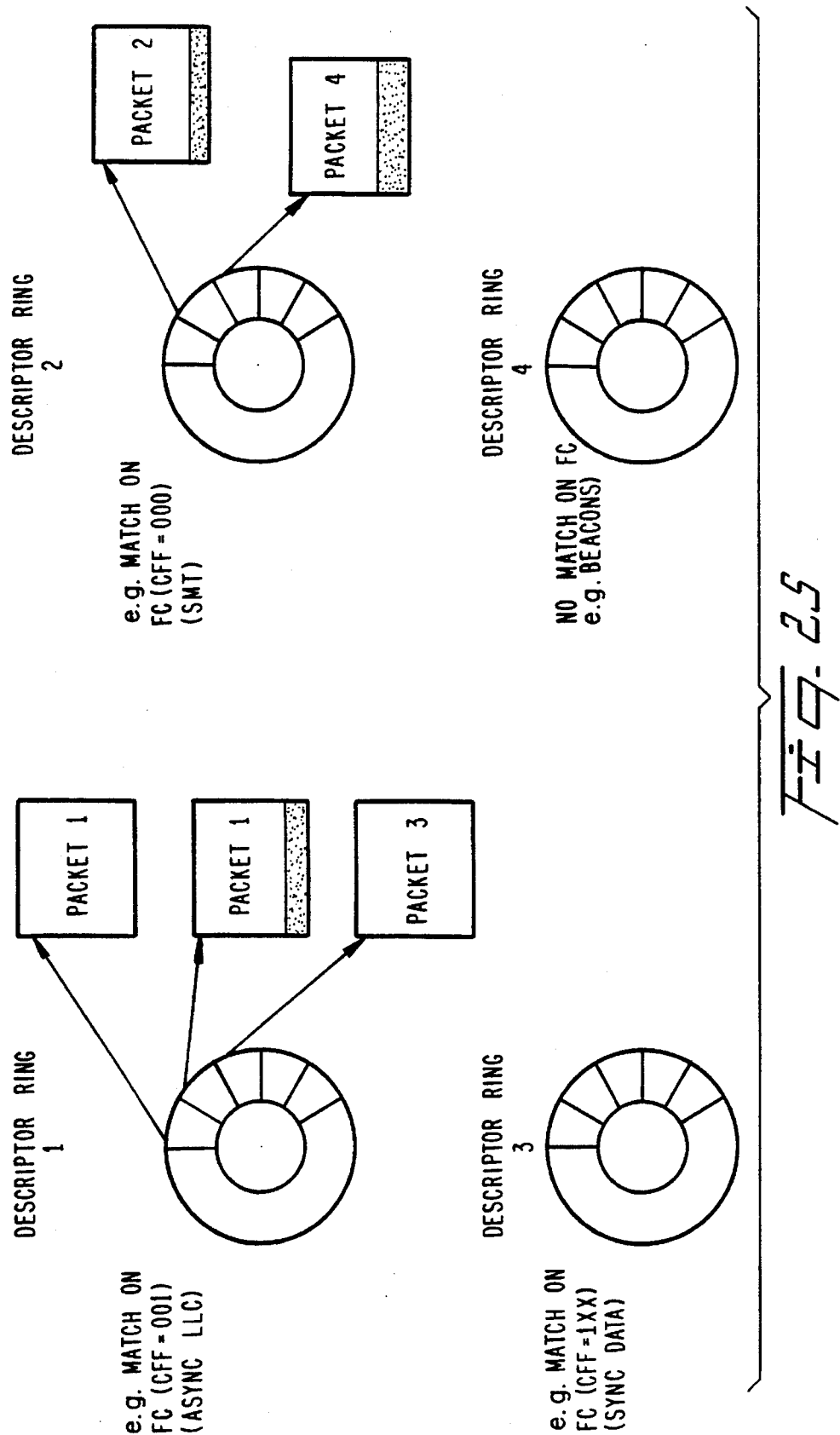
FIG. 25 is a diagram showing multiple receive rings in system memory receiving packets based on FC fields.

In accordance with another aspect of the invention, receive packets are scattered to particular descriptor rings in the system memory on the basis of a characteristic of each packet. In FDDI, packet characteristic may be defined by data in the FC field shown in FIG. 2. Referring to FIG. 25, if the FC field of an incoming packet matches a characteristic of the first descriptor ring, the packet is stored in a buffer pointed to by the first descriptor of that ring. If the packet exceeds the capacity of the first buffer, it begins to fill a second buffer pointed to by the second descriptor of the same ring.

Figure 26:
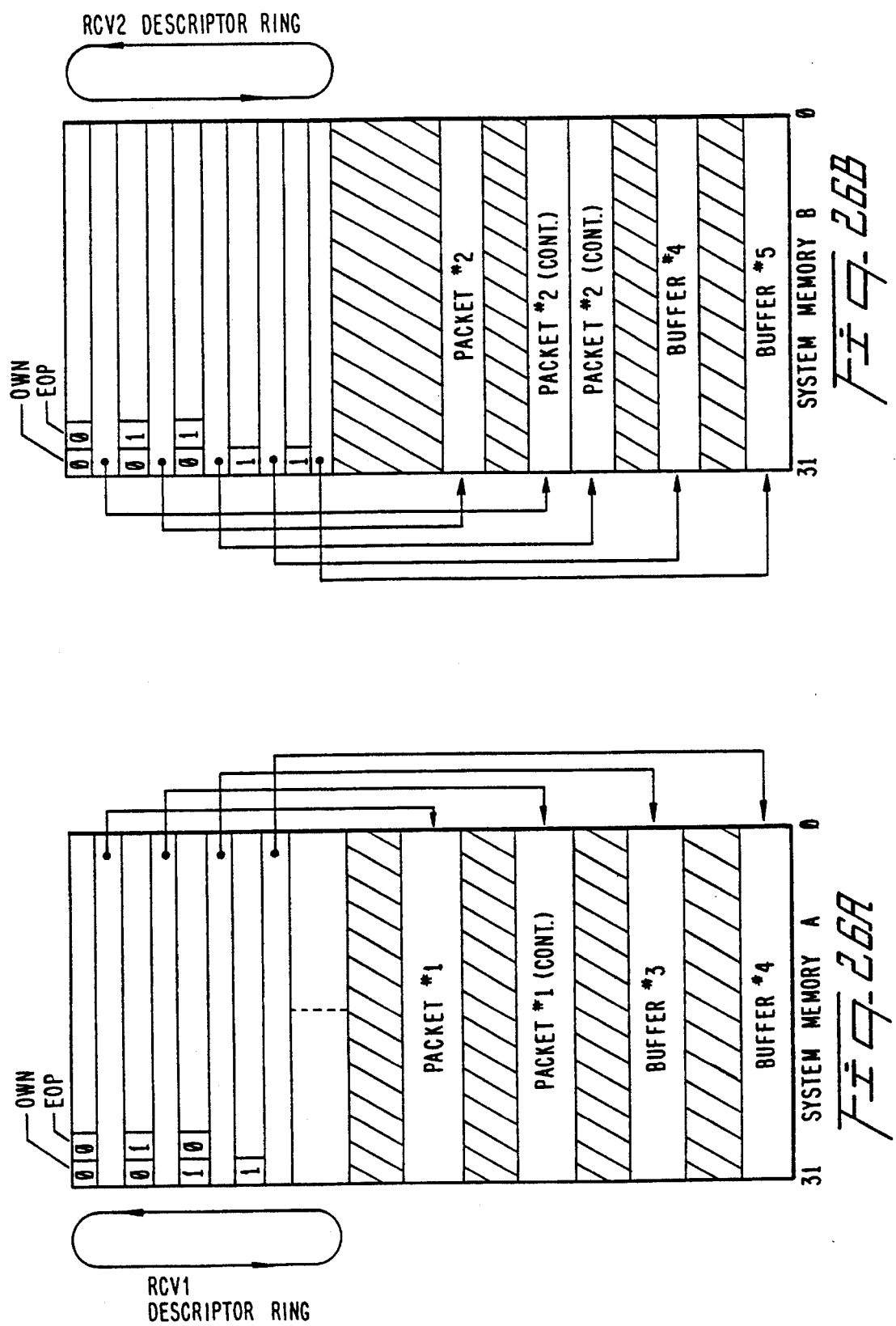
FIG. 26 is a diagram of receive frames routed to different descriptor rings based on FC fields.

Assume that the next packet (packet 2) has an FC field that matches descriptor ring 2, and that the size of the packet is slightly less than the capacity of the first buffer. Packet 2 partially fills the first buffer of ring 2, as shown in FIG. 25. A third packet of receive data has an FC field corresponding to descriptor ring 1, and is stored in the next available buffer pointed to by descriptor 3 in descriptor ring 1. A fourth receive packet contains an FC field corresponding to descriptor ring 2, and is stored in the next available buffer pointed to by the second ring, as shown. Storage of received packets based on frame type, is shown in more detail in FIG. 26. Selection of physical memories for storage of descriptors and receive data is carried out by handshaking with controller 124, as described earlier.

Under certain circumstances, a receive ring to which a packet is directed may become blocked. One example is when the ring is full, and cannot receive additional data for storage in corresponding buffers. Another example is when a parity error exists for that descriptor. In either case, in a "normal" mode of operation of the network DMA controller 124, all subsequent packets in the receive paths will be blocked until the blocking cause has been removed. This mode of operation assumes that a large buffer memory for receiving packets in receive queues can be accumulated until the blocked ring is cleared. In accordance with another aspect of the invention, there is a "discard on blocked receive" mode, wherein packets to be applied to a blocked receive ring will be discarded and subsequent packets are allowed to flow to their respective receive queues. This mode is useful when a small buffer memory (FIFO) in the network DMA controller is used.

Figure 27:
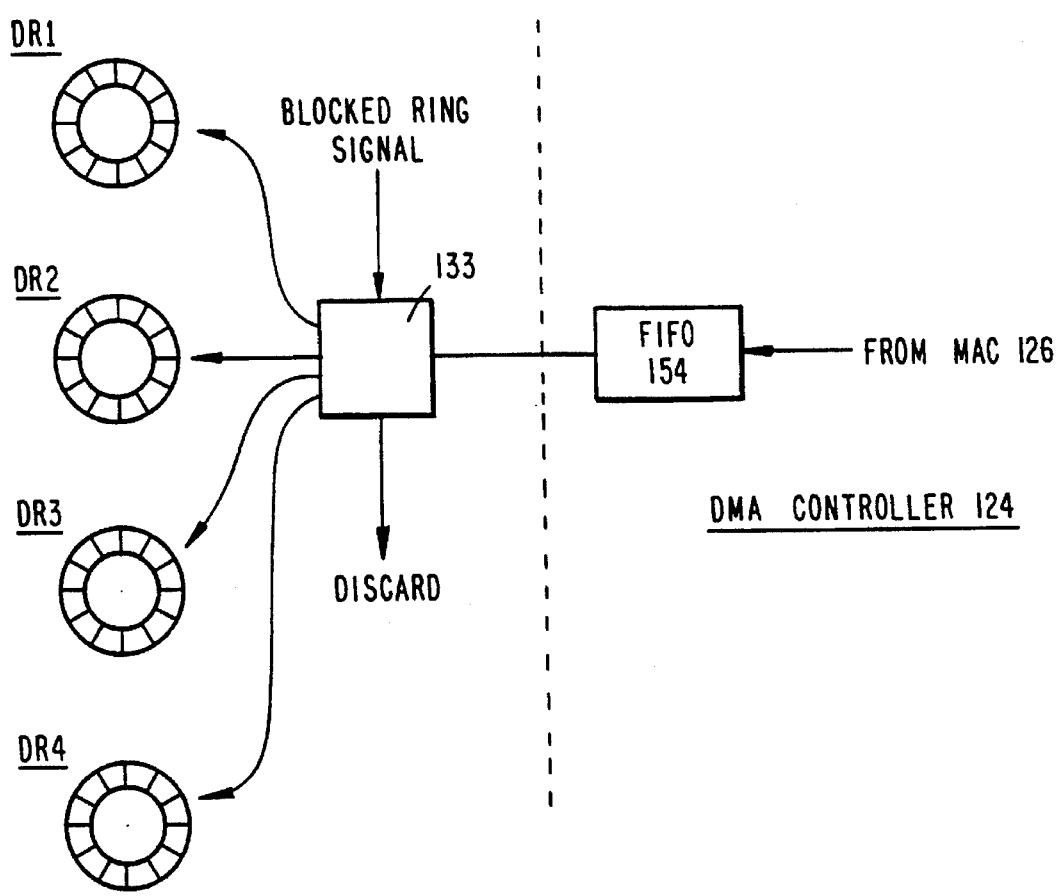
FIG. 27 is a diagram showing the "discard or blocked receive" mode of operation of the network DMA controller.

The "discard or blocked receive" mode is shown in FIG. 27. Receive FIFO 154 (see also FIG. 8) establishes a single flow path for receive packets, to be supplied to four descriptor rings based on the FC field of each packet. Alternatively, in the header/data splitting mode of operation of controller 124 the packets may be split to only the first two descriptor rings DR1 and DR2. A switch 133, which preferably is implemented by firmware in the network DMA controller 124, responds to a signal generated by controller 124 indicating that one of the descriptor rings receiving a packet has become blocked. In response, the switch 133 reroutes incoming packets to be discarded, as shown, rather than to be supplied to a designed one of the descriptor rings DR1–DR4.

In the normal mode of operation of the network DMA controller 124, upon detection by the controller of a blocked descriptor ring, incoming packets will continue to accumulate in FIFO 154. As mentioned, accumulation is acceptable only if FIFO 154 is relatively large. The normal mode of operation of controller 124 is advantageous if a large FIFO 154 is available, as no receive data will be lost.

On the other hand, the discard on blocked receive mode of operation shown in FIG. 27 is advantageous if a relatively small FIFO is implemented in the system, as the FIFO 154 will never be blocked. This enables incoming packets to continue to be applied to unblocked descriptor rings.

Medium access controller 120

Medium access controller 120, shown in more detail in FIG. 5, comprises a core medium access control (MAC) 162 for handling FDDI MAC protocol. The data I/O port of MAC 162 is connected to transmit and receive FIFOs 164 and 166. Data received from the network is supplied by the receiver FIFO 160 to the external buffer memory 126; data from the external buffer to be supplied to the network is stored in transmit FIFO 164. A FIFO control circuit 168 coordinates loading and unloading of the transmit and receiver FIFOs 164 and 160 based on memory arbitration decisions made by a memory arbiter 170.

An address generator 172 supplies required external buffer memory addresses on address bus 136 based on the access decision of the arbiter which determines whether the network or the node processor can access the buffer memory. A node processor interface 174, whose data input is controlled by address generator 172 via gate 173, decodes instructions from the node processor, collects chip status and distributes control information throughout the controller 124.

The transmit and receiver FIFOs 164 and 160, on-chip with medium access controller 120, store a number of data packets depending primarily on the latency of the system bus and burst length, in a manner similar to the transmit and receive sections 152 and 154 of the network DMA controller 124.

Buffer Memory 126

The output buffer memory 126, shown generally in FIG. 6 and in more detail in FIG. 7, is configured to have a receive FIFO 175 containing a queue of data received from the network and at least one, but preferably four, transmit FIFOs 177 each containing a queue of data to be supplied to the network. Four queues are shown in FIG. 7, described previously, to represent one synchronous queue and queues containing three levels of asynchronous priorities of data in accordance with FDDI specifications. How the data priorities are related to each other and are supplied to the network are detailed in copending applications (3) and (4), supra, incorporated herein by reference.

The format of the transmit frames, shown in FIG. 9, consists of data at bit positions 0–31 and a tag bit and followed by a descriptor word. The last word of each frame as well as a descriptor word has the tag bit set to "1", demarking the end of the frame. Packets to be transmitted are set up in the system memory by the host or node processor. READ, SHADOW WRITE, WRITE and END OF ADDRESS pointers are positioned as shown.

Loading of Transmit Frames In Buffer Memory

The transmission procedure is shown in overview in FIG. 10. Following set-up of data in the system memory, in step 182, if the current transmit queue in output buffer 126 is determined not to be "almost full", in accordance with copending application (4), supra, the network DMA controller 124 transfers (step 184) the data from the system memory to its internal transmit FIFO 152 shown in FIG. 8. The data next is transferred from the transmit FIFO 152 to (external) output buffer memory 126 (step 186).

More specifically, the transmit frames shown in FIG. 9 are loaded by the host and network DMA controller 124 into the buffer memory 126 under control of the medium access controller 120. This is carried out in response to a request by the network DMA controller 124 to write data to the buffer 126, encoded based on the particular queue being requested. Packets preferably are loaded into the buffer 126 at the same time that the buffer is being unloaded for transmission to the network so as to maximize bus utilization efficiency and minimize latencies, and avoid overrun or underrun conditions, as described in connection with FIG. 10(b) below.

Unloading of Transmit Frames from Buffer Memory

After a frame has been loaded into the buffer memory 126, when either it has been confirmed by the medium access controller 124 that an entire frame is loaded or that the number of words of the frame written into the memory exceeds a transmit threshold, the frame is ready for transmission to the network.

When a transmission to the network is available to the system, i.e., a token on the FDDI network is captured for transmitting a queue and transmission conditions for that queue are satisfied, transmission begins and the frame is read by the medium access controller 124 until the end of the frame, characterized by a logic "1" tag-bit, is encountered. At this time, frames of data are already being read into the buffer for subsequent transmission, before the buffer is emptied. That is, while transmission is in progress and after complete transmission of a frame, the medium access controller 124 fetches more data from the selected queue of the FIFO into its on-chip transmit FIFO 164 for transmission if a complete frame is in the buffer or if the content of the buffer exceeds the transmit threshold value. If neither condition is satisfied, the medium access controller 124 checks other queues, in order of priority, for transmission.

Transmission from a queue is completed when the queue is emptied. However, if the transmit FIFO 164 empties in the middle of a frame, an underrun condition is implied, and the current frame is aborted.

How transmission of data from the system to the network is carried out when at least one full frame or at least a predetermined amount of transmit data is in the buffer 126, is described in more detail in copending application (2).

Queues of transmit data stored in the buffer memory have the format shown in FIG. 11, wherein each frame contains long words characterized by a tag bit "0" and a last long word characterized by a tag bit "1". Following the last word of the packet is a status word also characterized by the tag bit "1". The status word reflects the status of the data buffer as well as the status of the packet including a number of predetermined bits, bits defining at which byte boundary the last word of data ends, bits copied from the status that the network DMA controller obtains from the system memory and a bit indicating whether the packet contains an error and should be aborted.

Loading of Receive Packets in Buffer Memory

Figure 13:
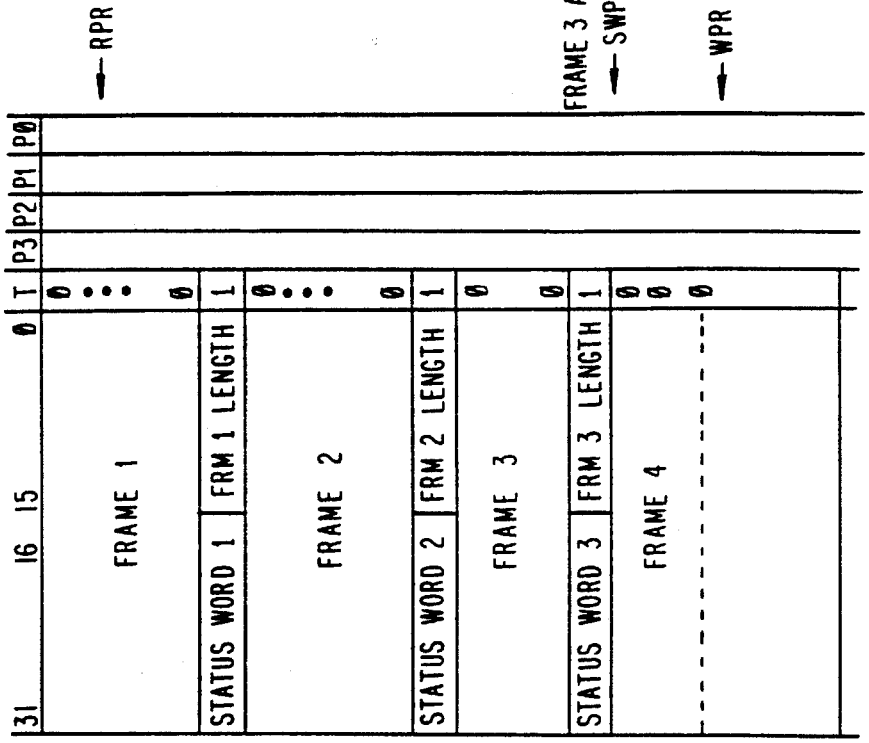
FIG. 13 is a diagram showing the structure of a buffer memory receive queue.
Figure 12:
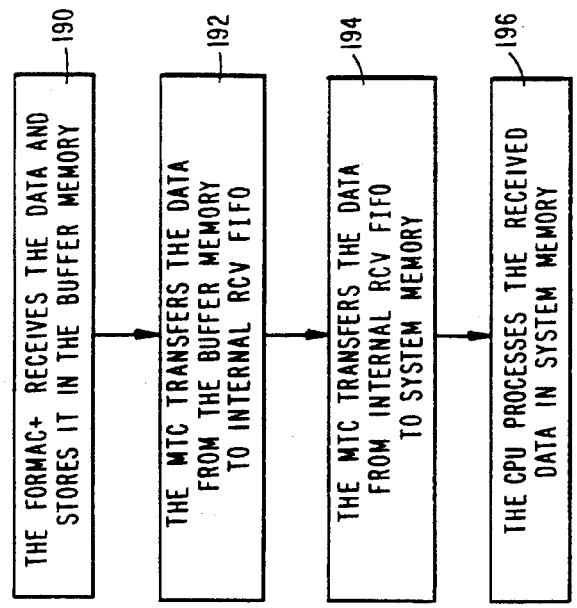
FIG. 12 is a generalized flow chart showing how data received from the network is moved to the system memory.

Reception of framed packets, shown in overview in FIG. 12(a), requires reception of data packets by the medium access controller 124 for storage in external buffer memory 126 (step 190), and transfer of the packet data from the buffer to the internal receive FIFO 154 of network DMA controller 124 (step 192). The format of receive frames stored in the buffer memory 126 is shown in FIG. 13.

Packets received from the network stored in buffer memory 126 by the medium access controller 120 are arranged in the memory in the manner shown in FIG. 14. The receive packets in the buffer memory are stored contiguously in succession, causing the buffer memory receive area to have the configuration of a circular queue. At the end of each packet, the medium access controller 120 stores the status of the packet. The tag bit is set to 0 for data and to 1 to identify the status word.

Unloading of Receive Frames from Buffer Memory

When the amount of data stored in the buffer 126 exceeds a receive threshold value, the network DMA controller 124 transfers the packet data from the internal receive FIFO 154 to the system memory to be processed by the host or node processor. This is controlled by the medium access controller 120 which instructs the network DMA controller 124 to transfer data from the buffer memory 126 into the system memory. This takes place when the number of words in the buffer memory exceeds a programmed receive threshold. Any overflow condition of the receive buffer queue during frame reception is indicated by the status word, indicating that the frame should be flushed.

How reception of data by the system is carried out when at least a predetermined amount of receive data is in the receive FIFO of buffer 126 is now described in more detail In copending application (2).

Network Access and DMA Controller Interfacing

FIG. 15 shows the signal flow paths among medium access controller 120, network DMA controller 124 and buffer memory 126. A buffer data bus BDATA, connected between medium access controller 120 and network DMA controller 124 as well as to buffer 126 preferably is a 32 bit bus, and an additional line BTAG carries the tag bit defining whether the BD bus contains frame data or frame status at the in of frame. The bus BDP carries buffer memory data parity bits for the BD bus and the BDTAG bus. All three of these buses, namely, BDATA, BTAG and BDP, are applied to buffer memory 126. Also applied to buffer memory 126 is an address bus BADDR that carries an address applied by the medium access controller 120, which preferably is a 16 bit address.

Signals required for transmitting to the network are supplied in any of a number of different queues, depending on priority as described in copending application (3) supra, determined by the data on a control bus QCNTRL. The control bus QCNTRL also indicates to the network DMA controller 124 that a queue that was previously full now is ready to accept additional data.

Also carried by the QCNTRL bus is data indicating transfer condition of data to any one of the queues, viz, the sync queue and the three levels of asynchronous queues, to transfer data to the medium. The transfer conditions provided by the medium access controller 120 informs the network DMA controller 124 that controller 120 has the token and currently is transmitting that particular queue from buffer memory 126 to the medium.

A bus HSACK (host acknowledge) carries a signal indicating that a present network DMA controller write or read request is being granted by the medium access controller 120. Together with this signal, buffer memory 126 is enabled, and data is present on BD (bus data), BDP (bus data priority) and BDTAG buses.

RDATA is asserted when the medium access controller 120 has stored received data from the network into the buffer memory, to be transferred by the network DMA controller 124 to the system memory. In response, the network DMA controller requests access to the bus, which is acknowledged by the medium access controller 120. The medium access controller 120 stores network data in buffer memory 126 at the address specified by data on the BADDR bus, and the data stored in buffer thereafter is transferred to the network DMA controller 124, in response to an assertion by the medium access controller 120 of the READ terminal of the buffer.

Figure 19:
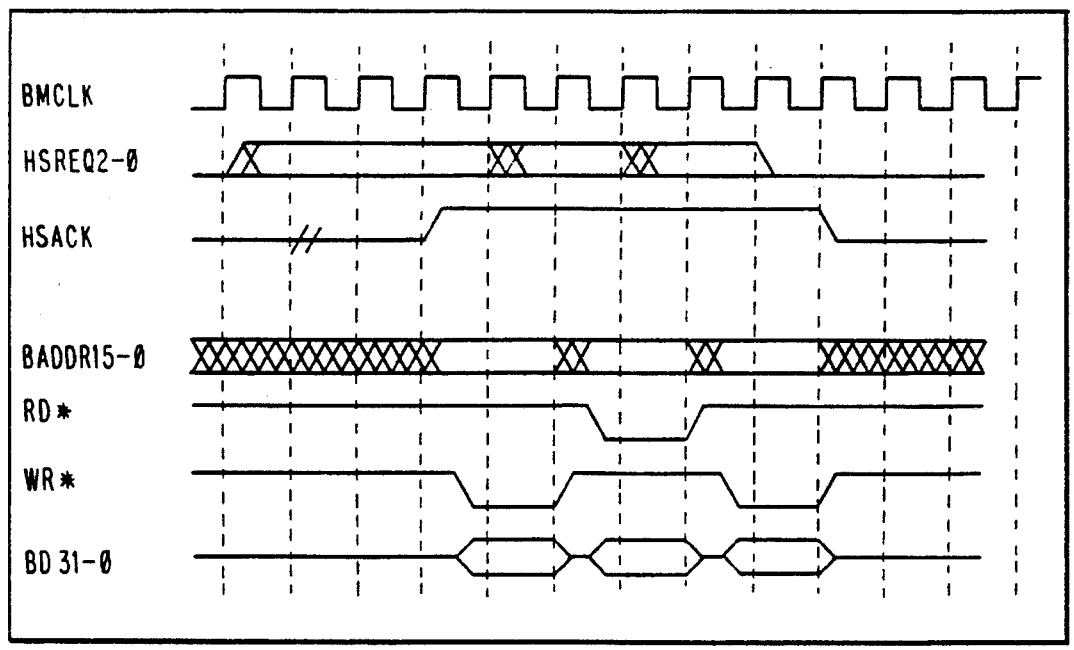
FIG. 19 is a timing diagram showing back-to-back read and write by the buffer memory.
Figure 17:
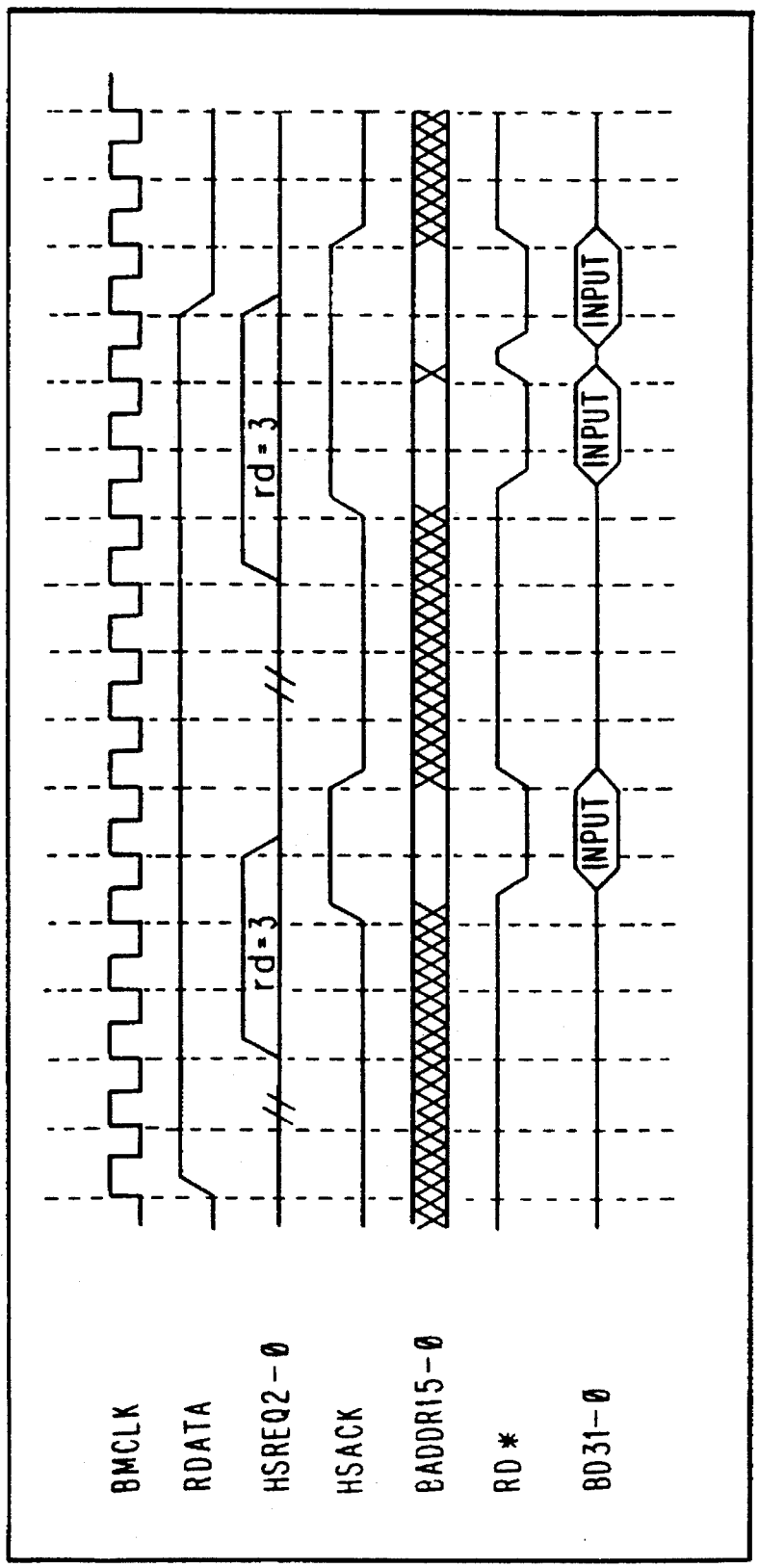
FIG. 17 is a signal timing diagram showing unloading receive frames by the buffer memory.
Figure 18:
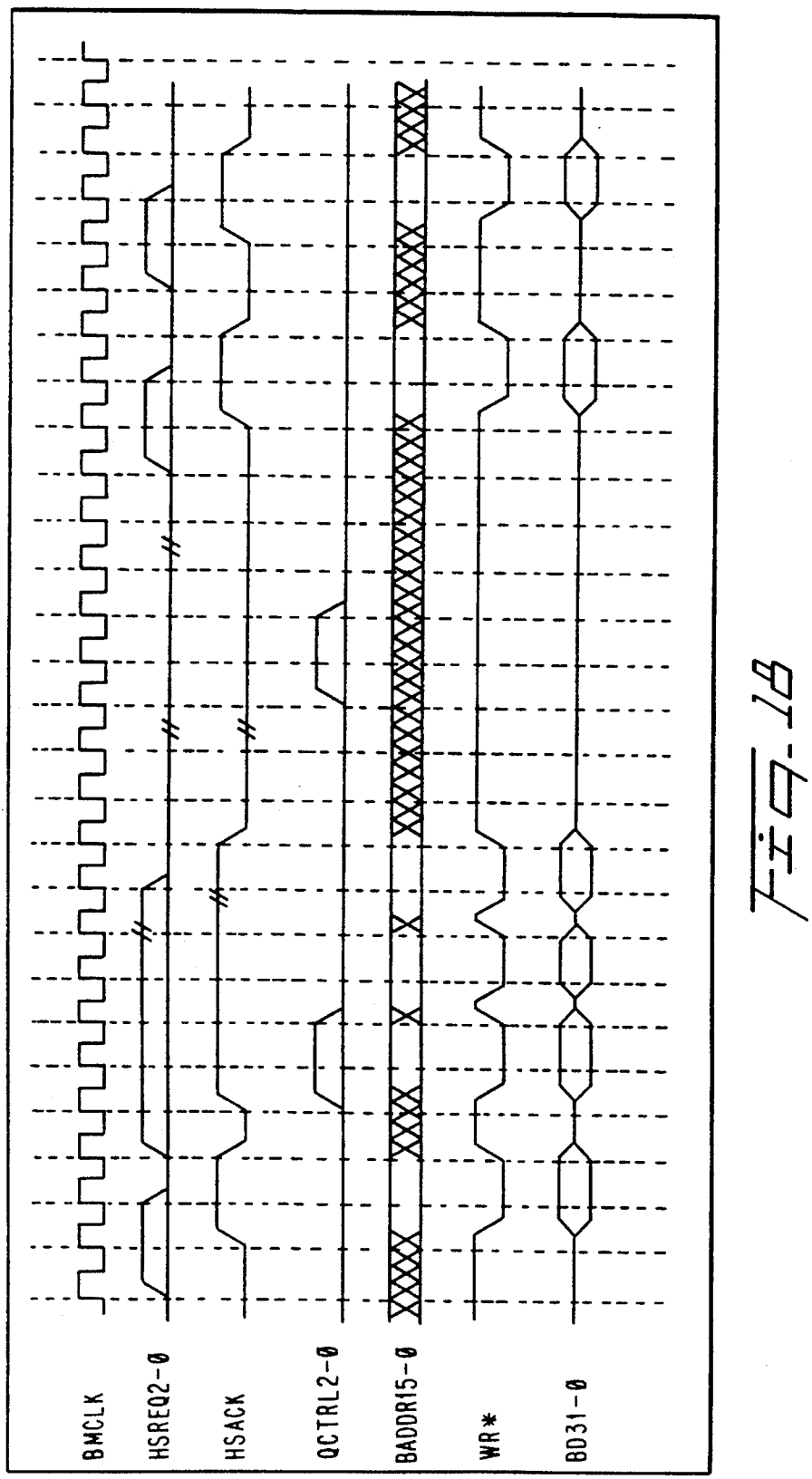
FIG. 18 is a signal timing diagram showing loading transmit frames in the buffer memory.

Handshaking between the network DMA controller 124 and medium access controller 120 carried out on the host request bus HSREQ, is shown in FIG. 15 and in the timing diagrams of FIGS. 17–19. Referring to FIGS. 15 and 17, timing of signals on the buses interfacing the network access controller 120, network DMA controller 124 and buffer 126 are synchronized to a buffer memory clock BMCLK signal shown therein, and RDATA is asserted to indicate that receive data in buffer memory 126 is ready to be read by the network DMA controller 124. In response to RDATA, the network DMA controller 124 carries out a host request on the host request bus HSREQ, with the proper code, to request to the network access controller 120 to read data frames from the network. The network access controller 120 arbitrates the bus of the buffer memory 126 and provides an acknowledgement on HSACK. The network access controller also addresses buffer memory 126, pointing to the location where data resides, asserts a read command to the buffer and latches data from the buffer, on BDATA, to the memory DMA controller 124.

Thus, the network access controller 120 stores network data in frames into buffer memory 126, and when the amount of data therein exceeds the receive threshold RTHR, the controller 120 asserts RDATA to cause the network DMA controller 124 to fetch descriptors from the system memory to determine where in the system memory the network data is to be stored. When the buffer in the system memory, pointed to by the descriptor, becomes available, the DMA controller 124 supplies a host acknowledgement HSACK to the network access controller 120. The network access controller 120, in response, arbitrates, since it may already be occupied transmitting data to the network, or carrying out other functions. If the network access controller 120 is available, it supplies an acknowledgement (HSACK) back to the DMA controller 124, and then outputs a storage address, followed by a read command, to buffer 126. The data addressed in the buffer 126 is written to BDATA and is latched in the network DMA controller 124 to be supplied to the designated buffer in system memory, to complete the handshaking necessary for receiving data from the network.

Referring to FIG. 18, timing of signals on the buses during transmission of frames to the network assumes that the network DMA controller 124 has already accessed buffers in system memory, pointed to by descriptors, to be transmitted to the network either because there is a full frame of transmit data or the amount of data in the buffer exceeds the transmit threshold XTH. The data to be transmitted currently is stored in the on-chip FIFO 152, in FIG. 8, and is ready to transfer that data to the logical FIFO in buffer memory 126. In response to a host request to transmit data to the network, the network DMA controller supplies a host request signal HSREQ to the network access controller 120, indicating that the host requests a write to the network. The particular queue to which the host will write is determined by the code on the HSREQ bus. In the present example, it is assumed that the host requests to write to the sync queue, so that sync frames of data are supplied to the network. In response, the network access controller 120 arbitrates, and when time is available, it is responds with an acknowledgement signal to the host (HSACK). The network access controller 120 also supplies to buffer memory 126 the address therein where the frames of data to be transmitted to the network are temporarily stored, and supplies to a write pulse to the buffer. Data supplied by the network DMA controller 124 on the BDATA bus accordingly is written into the logical FIFO formed in buffer memory 126 at the location specified by the network access controller 120 on BDADDR.

If no more data is to be transmitted to the network, the network DMA controller 124 provides no further requests on HSREQ to the network access controller 120. If additional data is to be transmitted to the network, on the other hand, the HSREQ bus remains asserted, and when the network access controller 120 arbitrates that time is available, it supplies an additional address and write pulse to the buffer 126 after acknowledging to the controller 124 on HSACK.

FIG. 19 shows the timing relationships of data on the buses during back-to-back read and write operations. In the example shown, the network access controller 120 initially is busy carrying out a write, then carries out a read operation and then returns to a write operation. The signals supplied to the various buses involved correspond in succession to those shown in FIGS. 17 and 18.

Conclusion

The invention provides efficient management of data at a network interface in several respects. In accordance with a first aspect of the invention, data can be gathered by a DMA controller from any of two or more physical memories on separate buses. The two memories may be host and node processor memories in a system architecture wherein a node processor carries out protocol processing while a host is supplying the data. Transmit frames are gathered from the two memories selectively by implementing a handshaking protocol of two sets of REQUEST/GRANT signals. A descriptor ring together with the first buffer storing each frame is in one of the memories (e.g., node processor memory). Any remaining buffers for the frame are in the other memory (e.g., host). The first buffer is sized to store only the header portion of the frame.

Receive frames are able to be stored into multiple descriptor rings within the two memories. Descriptors and header portions of receive frames can be stored in one memory while data portions and descriptors are stored in the other.

Handshaking protocol enables access by the DMA controller to one memory or the other residing on separate buses. Buffers storing the header and data portions of each frame are "synchronized" to each other by a common frame number carried by the header and data descriptors.

Each receive frame contains an identification field, such as an FC field in FDDI protocol. The descriptor ring into which the frame is stored is identified by matching the content of the identification field with a corresponding identifier associated with the ring.

If there is a blocked descriptor ring that may occur upon a filled ring or parity error, another aspect of the invention prevents blocking of the receive path to enable frames having destinations to non-blocked rings to continue to be received. In accordance with this aspect of the invention, in a discard mode of operation, and in response to a blocked ring, the DMA controller discards subsequent frames incoming to the blocked ring. In a normal mode of operation of the controller, frames incoming to the blocked descriptor ring are stored in a limited capacity FIFO memory within the receive path.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein. For example, although the invention is described in the environment of FDDI, it is not to be so limited.

What is claimed is:

1. A network controller for a local system coupled to a network, said local system including a plurality of processors and at least first and second memories for storing data arranged in buffers, said first and second memories respectively being on first and second busses and said first and second busses being connected to a third bus, the network controller comprising:

network DMA controller means on said third bus for sending thereon one or the other of a first memory request signal and a second memory request signal to said first and second memories in response to signals from one of said plurality of processors;

means coupled to said first bus and responsive only to said first memory request signal for sending a first memory acknowledgement signal to the DMA controller;

means coupled to said second bus and responsive only to said second memory request signal for sending a second memory acknowledgement signal to the DMA controller; and wherein said network DMA controller means includes means for accessing only the selected one of said first memory and second memory in response, respectively, to said first memory acknowledgement signal or said second memory acknowledgement signal.

2. The controller of claim 1, wherein said first and second memories comprise, respectively, host and node processor memories for storing at least one of receive data arranged in frames of packets received from the network and transmit data arranged with header and data information to be transmitted to the network.

3. The controller of claim 2, including means for accessing header information of the transmit data from said node processor memory and for accessing data information of the transmit data from said host processor memory for transmission to the network.

4. The controller of claim 2, wherein said transmit data are stored in buffers of a descriptor ring.

5. The controller of claim 1, wherein said first and second memories comprise a plurality of buffers arranged into descriptor rings, each memory having at least one descriptor ring.

6. The controller of claim 5 further comprising means for splitting receive data into header and data information and storing said header information in said at least one of said buffers of descriptor rings in said first memory and said data information in said at least one of said buffers of said descriptor rings in said second memory.

7. The controller of claim 5 further comprising means for storing each packet of receive data into buffers of the descriptor rings of said first and second memories, each packet of said receive data having a frame control field and buffers for storing each packet being selected in accordance with said frame control field.

8. The controller of claim 2, wherein said controller operates in one of a normal mode and a discard mode, said controller further comprising:

means for storing packets of said receive data during said normal mode when said first and second memories become full; and means for discarding packets of said receive data during said discard mode when said first and second memories become full.

9. A method of controlling data flow between systems on a network and first and second memories of a local system through a network adapter of the local system, said first and second memories storing data arranged in buffers, respectively, being on first and second buses, and said first and second buses being connected to a third bus and a DMA controller being coupled to the third bus, the method of controlling data flow comprising the steps of:

sending on said third bus one or the other of a first memory request signal and a second memory request signal to access a selected one of said first and second memories in response to signals from a processor of the local system;

in response to only said first memory request signal on the first bus, sending a first memory acknowledgement signal to the DMA controller;

in response to only said second memory request signal on the second bus, sending a second memory acknowledgement signal to the DMA controller; and in response to said first and second acknowledgement signals, accessing only the selected one of said first and second memories.

10. The method of claim 9 further comprising the steps of:

storing receive data from said network in the selected one of said first and second memories during a receive mode of the local system; and transferring transmit data stored in the selected one of said first and second memories to said network during a transmit mode of the local system.

11. The method of claim 9 further comprising the steps of:

storing receive data from said network in a temporary buffer during a normal mode of operation of the network adapter when the selected one of said first and second memories becomes full; and discarding incoming receive data from said network during a discard mode of operation of the network adapter when the selected one of said first and second memories becomes full.

12. A network adapter for coupling a local system to a network comprising:

a first memory on a first bus;

a second memory on a second bus;

a network controller on a third bus, said first and second busses being coupled to said third bus, and said network controller sending one or the other of a first memory request signal and a second memory request signal to said first and second memories in response to signals from a CPU of the local system;

means coupled to said first bus and responsive only to said first memory request signal for sending a first memory acknowledgement signal to said network controller, and means coupled to said second bus and responsive only to said second memory request signal for sending a second memory acknowledgement signal to said network controller, wherein said network controller further includes means for accessing only the selected one of said first and second memories in response, respectively, to said first or second acknowledgement signal; and means for transferring receive data from said network to said local system and transmit data from said local system to said network coupled to said network controller.

13. The network adaptor of claim 12, wherein said transferring means comprises:

medium access controller means coupled to said network controller for at least one of performing proper network access protocol, receiving and transmitting frames of receive data and transmit data and carrying out any required housekeeping functions;

coding means coupled to said medium access controller and said network for converting said receive data and transmit data into proper format for reception of said receive data by the network adaptor and for transmission of said transmit data to said network; and buffer means coupled to said medium access controller and said network controller for temporary storing said receive data.

14. The network adaptor of claim 12, wherein said first and second memories comprise, respectively, host and node processor memories for storing at least one of receive data arranged in frames of packets received from the network and transmit data arranged with header and data information to be transmitted to the network.

15. The network adaptor of claim 14 further comprising means for accessing said header information of the transmit data from said node processor memory and for accessing data information of the transmit data from said host processor memory for transmission to the network.

16. The network adaptor of claim 14, wherein said transmit data are stored in buffers of a descriptor ring.

17. The network adaptor of claim 12, wherein said first and second memories comprise a plurality of buffers arranged into descriptor rings, each memory having at least one descriptor ring.

18. The network adaptor of claim 17 further comprising means for splitting receive data into header and data information and storing said header information in said at least one of said descriptor rings of said first memory and said data information in said at least one of said descriptor rings in said second memory.

19. The network adaptor of claim 17 further comprising means for storing each packet of receive data into buffers of the descriptor rings of said first and second memories, each packet of said receive data having a frame control field and buffers for storing each packet being selected in accordance with said frame control field.

20. The network adaptor of claim 14, wherein said network controller operates in one of a normal mode and a discard mode, said network controller further comprising:

means for storing packets of said receive data during said normal mode when said first and second memories become full; and means for discarding packets of said receive data during said discard mode when said first and second memories become full.

* * * * *